(12) United States Patent
Ougouag et al.

(10) Patent No.: US 12,345,240 B1
(45) Date of Patent: Jul. 1, 2025

(54) NUCLEAR REACTOR AND ASSOCIATED COMPONENTS, SYSTEMS, AND METHODS

(71) Applicant: Battelle Energy Alliance, LLC, Idaho Falls, ID (US)

(72) Inventors: Abderrafi M. Ougouag, Idaho Falls, ID (US); Ramazan S. Sen, Idaho Falls, ID (US); George W. Griffith, Idaho Falls, ID (US); Yasir Arafat, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 18/747,268

(22) Filed: Jun. 18, 2024

(51) Int. Cl.
*G21D 3/08* (2006.01)
*F03G 7/06* (2006.01)

(52) U.S. Cl.
CPC .............. *F03G 7/0641* (2021.08); *G21D 3/08* (2013.01)

(58) Field of Classification Search
None
See application file for complete search history.

(56) References Cited

U.S. PATENT DOCUMENTS

| | | | |
|---|---|---|---|
| 2016/0116232 A1* | 4/2016 | Koplow | F28F 3/02 165/109.1 |
| 2018/0109061 A1* | 4/2018 | Pardhan | G01S 7/4813 |
| 2022/0076854 A1* | 3/2022 | Ougouag | G21C 15/12 |

\* cited by examiner

*Primary Examiner* — Shafiq Mian
(74) *Attorney, Agent, or Firm* — TraskBritt

(57) ABSTRACT

A method of operating a nuclear power system includes generating heat in a nuclear reactor core, transmitting the heat to a heat engine, generating electricity with a generator operatively coupled to the heat engine. The method further includes detecting a no-load condition, and stopping the heat engine. The method also includes transferring heat from an outer surface of the nuclear reactor to the environment through a heat transfer system if a temperature of the nuclear reactor rises above a threshold temperature. The method further includes preventing heat from transferring from the outer surface of the nuclear reactor to the environment through the heat transfer system if the temperature of the nuclear reactor is below the threshold temperature. Nuclear power systems and nuclear reactors are also disclosed.

17 Claims, 14 Drawing Sheets

NUCLEAR REACTOR AND ASSOCIATED COMPONENTS, SYSTEMS, AND METHODS

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

Embodiments of the present disclosure generally relate to energy production devices. In particular, embodiments of the present disclosure relate to nuclear reactors and associated components, systems, and methods.

BACKGROUND

Some energy production devices harness heat by capturing, storing, or converting the heat to another form of energy, such as electrical energy. The heat may be produced through burning processes, such as in coal fired power plants, or by heat generated by a reactor, such as a nuclear reactor. Nuclear reactors contain and control nuclear chain reactions that produce heat through a physical process named fission, where a particle (e.g., a neutron) impinges or impacts an atom nucleus, which then splits into two smaller nuclei and some additional neutrons. Some of the released neutrons then collide with other nuclei, causing them to also fission and release more neutrons. A nuclear reactor achieves criticality (commonly referred to in the art as going critical) when each fission event releases a sufficient number of neutrons to sustain an ongoing series of reactions at a constant rate. Fission also releases a large amount of heat. The heat may be removed from the reactor by a circulating fluid. This heat may then be used to produce electricity or may be harnessed and stored for other uses, such as heating a facility or heating water.

SUMMARY

Embodiments of the disclosure include a nuclear power system. The system includes a nuclear reactor configured to generate heat. The system further includes a heat engine operatively coupled to the nuclear reactor, the heat engine configured to convert the heat from the nuclear reactor to mechanical energy. The system also includes a generator operatively coupled to the heat engine, the generator configured to generate electricity from the mechanical energy of the heat engine. The system further includes a brake coupled to at least one of the heat engine and the generator, the brake configured to restrict movement of the at least one of the heat engine and the generator when there is no electrical load on the generator.

Other embodiments of the disclosure include a method of operating a nuclear power system. The method includes generating heat in a nuclear reactor core. The method further includes transmitting the heat to a heat engine. The method also includes generating electricity with a generator operatively coupled to the heat engine. The method further includes detecting a no-load condition. The method also includes stopping the heat engine. The method also includes transferring heat from an outer surface of the nuclear reactor to an environment surrounding the nuclear reactor through a heat transfer system if a temperature of the nuclear reactor rises above a threshold temperature. The method further includes preventing heat from transferring from the outer surface of the nuclear reactor to the environment through the heat transfer system if the temperature of the nuclear reactor is below the threshold temperature.

Another embodiment of the disclosure includes a nuclear reactor. The nuclear reactor includes a reactor core. The nuclear reactor further includes a heat transfer system surrounding the reactor core. The heat transfer system includes an inner wall, an outer wall, and a volume defined between the inner wall and the outer wall. The outer wall is configured to move relative to the inner wall and change a relationship between the inner wall and the outer wall.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

Figure 1A:
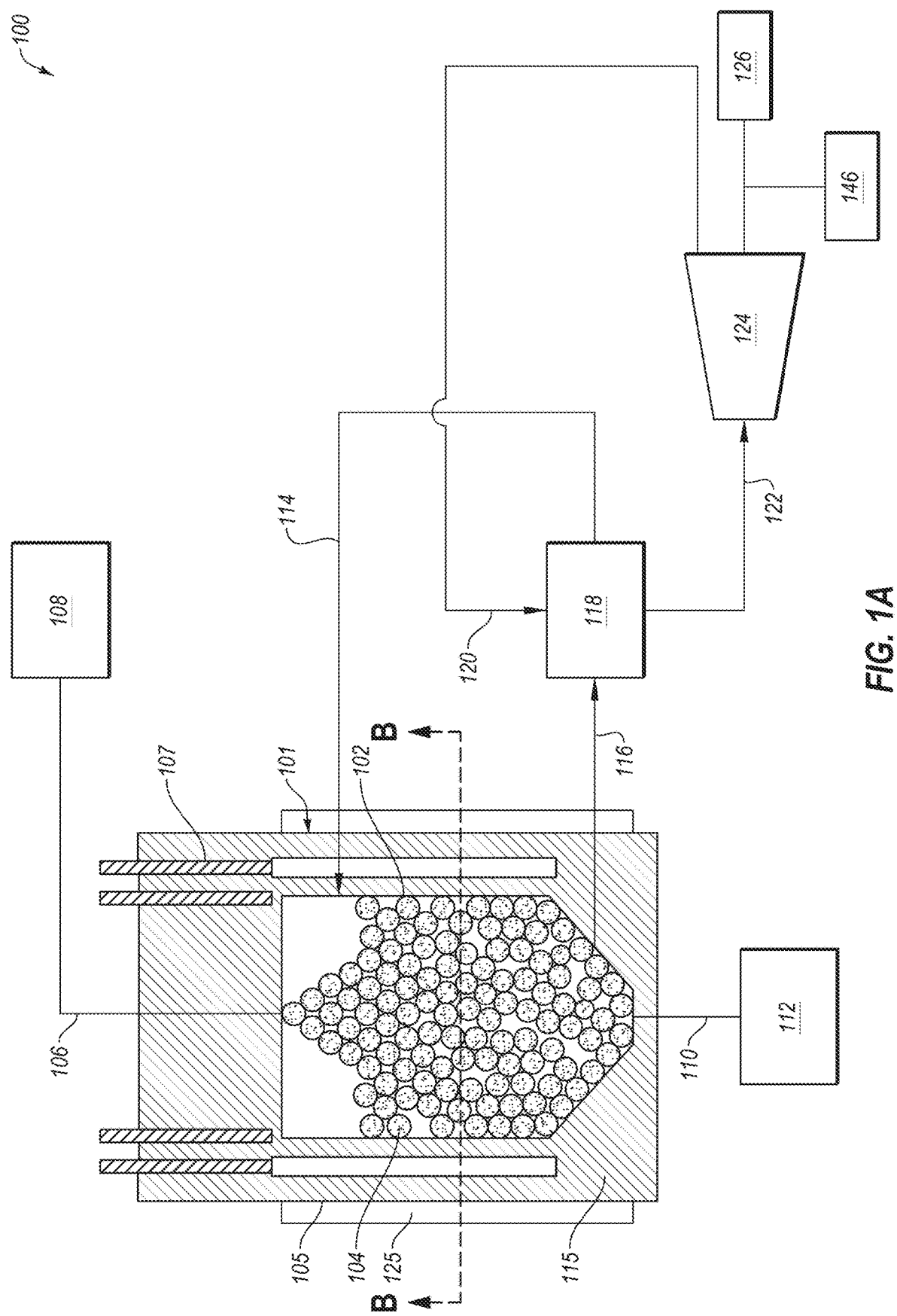
FIG. 1A illustrates a schematic view of a nuclear power plant system in accordance with embodiments of the disclosure.

The illustrations presented herein are not meant to be actual views of any particular energy production device or component thereof, but are merely idealized representations employed to describe illustrative embodiments. The drawings are not necessarily to scale.

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even at least about 100% met.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

As used herein the term "temperature threshold" identifies the temperature at which heat transmission becomes substantial in situations involving radiative thermal transfer. "Temperature threshold" also designates a temperature at which it is desirable for heat transmission to become substantial. It is noted that at the temperatures relevant to reactor physics, radiative heat transfer is not necessarily a threshold phenomenon. However, the rate of transfer can be affected by changes in view factors between the surface emitting the thermal radiation and the surface receiving it. It can also be affected by surface treatments and material compositions. This in turn implies that the temperature at which a certain amount of thermal energy is transmitted through a system can be adjusted by changing the system's view factors through varying its geometric arrangement or by treating the surfaces to modify their properties. Thus, by extension, the temperatures can be considered as thresholds. In the disclosure, an upper threshold temperature may be understood as a temperature at which and/or above which cooling is needed as this temperature must not be exceeded as it could, for example, result in damage to the fuel or to structural components. Another threshold temperature is a lower threshold temperature below which a reactor may experience a rise in reactivity that may be sufficient to cause criticality (e.g., because of increased neutron moderation). Another set of threshold temperatures is the set of temperatures at which the reactor fuel, the core, the coolant, and the balance of plant is raised for the plant to operate. These are collectively identified as the "operating temperature" and can be viewed as a threshold below which the reactor may not operate.

Energy production devices, in particular, nuclear energy production devices are typically large and require large amounts of space, cooling capacity, etc., to operate. Reducing a size and increasing an efficiency of nuclear energy production devices may facilitate the introduction of nuclear power to remote and/or rural areas still dependent on fossil fuel based energy, such as oil, coal, and natural gas. For example, nuclear micro reactors are generally only economical at power levels substantially above 1 Megawatt. By increasing the efficiency and reducing the size of a nuclear energy production device, nuclear power may become an economical solution for much lower power levels such as would be typical of rural area needs, business complexes, data centers, remote mines, small military camps, field hospitals, outer space surface missions, etc. In some embodiments, the size of a nuclear energy production device may be reduced by arranging the components of the nuclear energy production device in a way that may eliminate the need for some parts or components of the nuclear energy production device. As many moving parts and/or components are also driven by electricity this may further increase the efficiency of the nuclear energy production device as well. Similarly, reducing the size and increasing the efficiency of the nuclear energy production device may reduce the amount of fuel required for equal electrical energy production, reducing the cost of the nuclear-based electrical energy production of the device, making it more economical. Reducing the size and complexity of the nuclear energy production device may also reduce the need for a full-time human operator, which may further increase the economical nature of the nuclear energy production device.

Fission batteries are a category of microreactors that generate up to 250 MW of thermal energy. The thermal energy may be used directly or may be used to generate electricity. The goals of fission batteries are to be economical, standardized, easily installed, unattended and reliable. Fission batteries are generally also small and easily transportable. However, conventional microreactors and fission battery concepts do not include any that would truly perform like a battery, with the fission process stopping when energy is not supplied to the power grid and restarting when energy is supplied to the grid. In conventional systems, the reactor remains at power (either full or reduced) and the generated thermal energy is dissipated to the environment (with the coolant/working fluid by-passing the turbines) or the electrical energy that is generated stored into chemical technology electric batteries. In some instances, the reactor is shut down, but in these cases, restart is not instantaneous and at will. The embodiments of the disclosure are directed to a reactor that operates similar to a battery, shutting down the nuclear fission reactions when power is not provided to the grid and restarting instantly and at will when power is needed for supplying to the grid or for other use. Besides the more rational use of the nuclear fuel resources, the features described in the disclosure provide greatly enhanced safety over other reactor concepts and facilitate fully autonomous unattended operation of a fission battery.

Conventional nuclear energy production devices take a long time to turn on due to warm up times used to bring a reactor core and balance of plant up to operating temperatures. This also makes it difficult to turn off a reactor in a no load or low load condition. In smaller installations or rural installations low load and/or no load conditions may occur more frequently than in more populated areas. The ability to turn an energy production device on and off based on demand may both increase the efficiency of the associated energy production device and facilitate using the energy production device in smaller installations or in rural installations.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow, system, or method for forming an enhanced heat transfer system (e.g., an enhanced path to an ultimate heat sink (UHS)) for a nuclear reactor, or for removing heat from a nuclear reactor. Only those process acts and structures necessary to understand the embodiments of the disclosure are described in detail below. Additional acts to form a heat transfer system to remove heat from a nuclear reactor may be performed by conventional techniques. Further, any drawings accompanying the present application are for illustrative purposes only and, thus, are not drawn to scale. Additionally, elements common between figures may retain the same numerical designation.

According to embodiments described herein, a heat transfer system for selectively removing heat from a nuclear reactor utilizes a passive heat transfer mechanism for removing heat from the nuclear reactor when other heat removal paths and heat removal mechanisms are no longer sufficient to cool the nuclear reactor (e.g., when the rate of heat generation of the nuclear reactor is greater than the rate of heat removal from the nuclear reactor by normal convection to the energy conversion system), during reactor shut down status during which normal heat removal systems are not operating, or during equipment failure (e.g., loss of coolant or loss of coolant circulation). The heat transfer system may be sized, shaped, and configured to exhibit thermally insulative properties at normal operating temperatures of the nuclear reactor and to exhibit thermally conductive properties at temperatures exceeding normal operating temperatures of the nuclear reactor or at temperatures exceeding a set design limit above the normal operating temperatures. As such, the heat transfer system may be referred to herein as a "heat transfer valve." The heat transfer system may include an inner wall around at least a portion of the nuclear reactor at the level of the nuclear reactor core, and an outer wall surrounding the inner wall. In some embodiments, a volume between the inner wall and the outer wall may include fins that facilitate radiative heat transfer from the inner wall to the outer wall. The fins may be vertical or horizontal. The outer wall may be in contact with an external environment to conductively transfer heat from the outer wall to the external environment (an external heat sink, such as one or more of the ground of the Earth, the atmosphere, and a body of water), may be configured to convectively transfer heat therefrom to the external environment, or both. In some embodiments, heat is transferred from the nuclear reactor to the inner wall via convective and/or conductive heat transfer and from the inner wall to the outer wall by (e.g., substantially completely by, completely by) thermal radiation. In some embodiments, heat may not be substantially transferred from the inner wall to the outer wall by other means, such as by convective heat transfer or conductive heat transfer. The heat transfer system may be structured to facilitate removal of heat from the nuclear reactor at temperatures greater than a predetermined temperature based on the desired operating parameters of the nuclear reactor core, while not substantially removing heat from the nuclear reactor at normal operating temperatures. Accordingly, the heat transfer system may not undesirably remove heat from the nuclear reactor and reduce the efficiency thereof during normal use and operation and may help to maintain the temperature of the reactor in low load conditions. The heat transfer system may be sized, shaped, and configured to facilitate sufficient removal of heat from the nuclear reactor core during emergency situations and may facilitate increasing the safe power generation capacity (e.g., the power density) of the nuclear reactor core.

FIG. 1A is a simplified schematic illustrating a nuclear power plant system 100 for generation of power, in accordance with embodiments of the disclosure. The nuclear power plant system 100 includes a nuclear reactor 101 including a nuclear reactor core (which may also be referred to herein simply as a "reactor core") 102 configured to generate heat for the production of electricity. The reactor core 102 may comprise, for example, a pebble bed core. In some such embodiments, the reactor core 102 includes fuel 104 (e.g., a nuclear fuel formulated to undergo fission reactions to generate heat). The nuclear fuel 104 may include fuel pebbles, fuel rods, fuel blocks (e.g., prismatic fuel blocks), liquid fuel (e.g., molten salt).

The reactor core 102 may be surrounded by a vessel 105, which may contain, for example, the components of the reactor core 102 (e.g., the fuel 104, a neutron reflector, a heat shield, etc.). The vessel 105 (which may also be referred to herein as a "reactor vessel") may comprise, for example, a metal (e.g., steel, stainless steel, etc.). In some embodiments, the vessel 105 comprises steel.

In some embodiments, a fuel make-up feed 106 is in operable communication with the reactor core 102 and may provide fresh fuel 104 (e.g., fuel pebbles, liquid fuel, etc.) to the reactor core 102 from a fuel supply system 108. During use and operation of the reactor core 102, the fuel 104 is transferred from an upper portion of the reactor core 102 downward toward an outlet 110 where the fuel 104 that has transited through the reactor core 102 exits the reactor core 102 and enters a storage system 112. In some embodiments, the fuel 104 may be transferred through the reactor core 102 more than once before they are spent. In other words, in some such embodiments, the fuel 104 from the storage system 112 may be recirculated to the fuel supply system 108.

A reactor reflector 115 (also referred to as a "neutron reflector") may be disposed around the reactor core 102 and located between the reactor core 102 and the vessel 105. The reactor reflector 115 may include one or more of graphite, beryllium, beryllium oxide, water, and heavy water.

One or more control rods 107 formulated and configured to control a fission rate of the nuclear fuel 104 may be located within the reactor reflector 115 or within the reactor core 102. The control rods 107 may include one or more materials formulated and configured to absorb neutrons. By way of non-limiting example, the control rods 107 may include one or more of boron, cadmium, silver, lithium, and indium. In some embodiments, the control rods 107 comprise boron.

With continued references to FIG. 1A, a coolant fluid 114 may flow through the fuel 104 of the reactor core 102 to form a heated coolant fluid 116. In some embodiments, the heated coolant fluid 116 exiting the reactor core 102 has a temperature greater than about 600° C., such as greater than about 700° C., greater than about 800° C., or greater than about 900° C. In some embodiments, the nuclear fuel 104 is included in the coolant fluid 114, such as in a liquid fuel reactor, where the liquid fuel travels through the reactor as a coolant fluid 114 and the liquid fuel is heated in the reactor through fission reactions created in the suspended particles or in dissolved fissile nuclides in the liquid fuel.

The heated coolant fluid 116 may exit the reactor core 102 and enter a heat exchanger 118 where heat from the heated coolant fluid 116 is transferred to a working fluid 120 to cool the heated coolant fluid 116 to the temperature of the coolant fluid 114. The cooled coolant fluid 114 is recirculated to the reactor core 102 to flow through the fuel 104 and generate the heated coolant fluid 116 and the cycle is repeated.

The working fluid 120 may be heated by the heated coolant fluid 116 in the heat exchanger 118 to form a heated working fluid 122. In some embodiments, the working fluid 120 is water (e.g., liquid water) and the heated working fluid 122 may be steam. In some such embodiments, the working fluid 120 undergoes a phase change within the heat exchanger 118. The heated working fluid 122 may interact with a heat engine 124, such as a turbine, sterling engine, reciprocal cylinder, etc., configured to convert the heat in the heated working fluid 122 to mechanical energy. The heat engine 124 is, in turn, coupled to an electric generator 126 for generating electricity.

A brake 146 may be included in the nuclear power plant system 100. The brake 146 may be configured to slow and/or stop the heat engine 124 in a no-load condition to stop the generation of electricity. For example, in some embodiments, the brake 146 is positioned on a mechanical shaft of the heat engine 124 between the heat engine 124 and the electric generator 126. In other embodiments, the brake 146 is positioned directly on the heat engine 124. In other embodiments, the brake 146 is positioned directly on the electric generator 126. The brake 146 may include a friction braking system, configured to induce friction on the associated rotating element through contact to slow and or stop the associated element. In other examples, the brake 146 may be a magnetic brake configured to induce an opposing magnetic field, such as through an electrical coil, electromagnet, or permanent magnets on the associated component.

The heated working fluid 122 is cooled by the heat engine 124, where heat is removed from the heated working fluid 122 and converted to mechanical energy. In some embodiments, the heated working fluid 122 goes through another phase change (e.g., from a vapor to a liquid) to re-form the working fluid 120. The working fluid 120 is circulated back to the heat exchanger 118 to be re-heated by the heated coolant fluid 116.

During normal operation (e.g., steady state operation) of the nuclear reactor core 102 and the balance of the nuclear power plant system 100, except for expected losses to the periphery of the reactor, the heat removed from the nuclear reactor 101 by the coolant fluid 114 may be substantially equal to the heat generated within the nuclear reactor core 102 by the fuel 104. However, in situations where the nuclear reactor 101 generates more heat than is removed by the coolant fluid 114, such as when circulation of the coolant fluid 114 is impeded or when the fluid is lost, the nuclear power plant system 100 may include a heat transfer system for preventing damage to the fuel 104 and the nuclear reactor 101 that would otherwise be caused by being exposed to excessive temperatures.

Figure 1B:
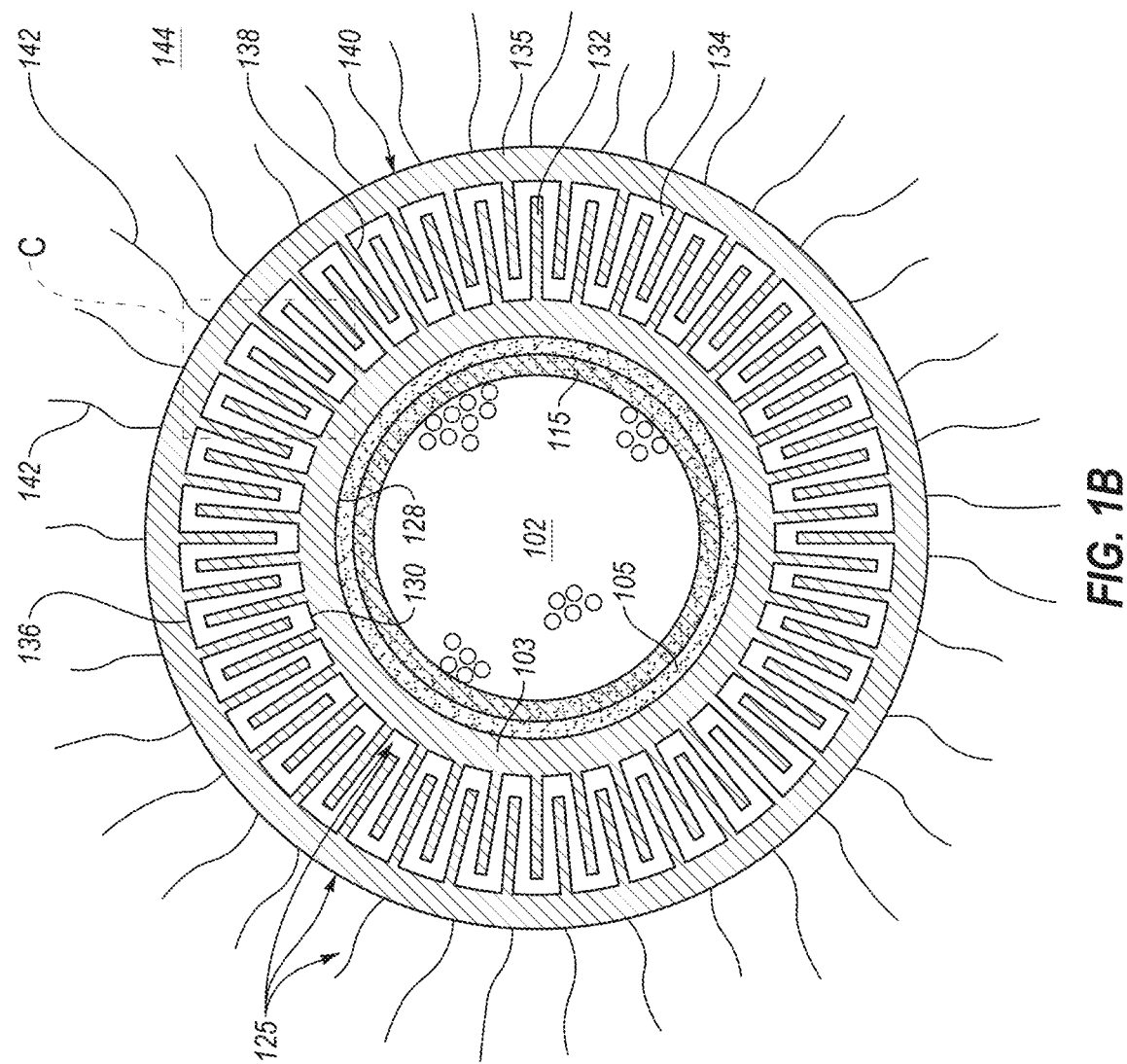
FIG. 1B illustrates a cross-sectional view of the nuclear reactor of FIG. 1A.

With continued reference to FIG. 1A, a heat transfer system 125 may be disposed around the vessel 105. For simplicity of illustration, details of the heat transfer system 125 are not illustrated in FIG. 1A and are illustrated in FIG. 1B, which is a simplified cross-sectional view of the nuclear reactor 101 and the heat transfer system 125 surrounding the vessel 105 taken through section line B-B of FIG. 1A, in accordance with embodiments of the disclosure. In order to show details, the scale and proportions of the elements represented in FIG. 1B are not the same as in FIG. 1A. The heat transfer system 125 may be located between the vessel 105 surrounding the nuclear reactor core 102 and a surrounding environment 144. The heat transfer system 125 may comprise an inner wall 103 in contact with an outer surface of the vessel 105 of the nuclear reactor core 102. The inner wall 103 may include an inner surface 128 and an outer surface 130 opposite the inner surface 128.

The heat transfer system 125 may further include an outer wall 135 defined by an inner surface 136 and an outer surface 140 (shown by an arrow to distinguish from heat transfer structures 142). A space between the inner surface 136 of the outer wall 135 and the outer surface 130 of the inner wall 103 may define a volume 134. In some embodiments, the volume 134 is filled with air (e.g., a composition including about 78 atomic percent nitrogen, about 21 atomic percent oxygen, and about 1 atomic percent argon) or with nitrogen. In other embodiments, the volume 134 may include one or more materials (e.g., gases) having a thermal conductivity less than a thermal conductivity of air, such as one or more of argon or carbon dioxide. In yet other embodiments, the volume 134 is under vacuum or a partial vacuum.

In some embodiments, at least a portion of the outer wall 135 may be in contact with the surrounding environment 144. The surrounding environment 144 may comprise an ultimate heat sink for the nuclear reactor 101 (FIG. 1A) such as, for example, the Earth (e.g., the ground), the atmosphere (e.g., the air above the ground and in the sky), water, or another heat sink. In some embodiments, at least a portion of the outer wall 135 is buried below a surface of the Earth. In yet other embodiments, at least a portion of the outer wall 135 is exposed to air, such as ambient air. In yet other embodiments, at least a portion of the outer wall 135 is surrounded by an ultimate heat sink comprising water. In yet other embodiments, at least a portion of the outer wall 135 is in contact with an ultimate heat sink via the heat transfer structures 142.

The outer surface 140 may include heat transfer structures 142 coupled thereto and extending into the environment 144. The heat transfer structures 142 may include any material suitable for removing heat from the outer surface 140 to the environment 144 by one or more of conductive heat transfer, convective heat transfer, or radiative heat transfer. By way of non-limiting example, the heat transfer structures 142 may comprise fins, ribbons, plates, cables, thermal radiators, a mesh, an antenna, or another material structure. In some embodiments, the heat leaving from the outer surface 140 of the heat transfer system 125 is removed by natural convection of air in the environment 144. In other words, the outer surface 140 is cooled by natural convection.

In some embodiments, the heat transfer structures 142 are in direct contact with the environment 144, such as the Earth (e.g., soil). In other embodiments, the heat transfer structures 142 extend into a heat sink comprising water. The heat transfer structures 142 may transfer heat from the outer wall 135 to the environment 144 by conductive heat transfer. In some embodiments, at least some of the heat transfer structures 142 extend into the atmosphere and are formulated and configured to remove heat from the outer wall 135 by convective heat transfer (e.g., such as with wind passing adjacent to heat transfer structures 142).

As will be described herein, heat may be transferred from the nuclear reactor 101 (FIG. 1A) starting in the core 102 through the reflector 115 to the vessel 105 of the nuclear reactor 101 to the inner surface 128 of the inner wall 103. Heat may be transferred from inner surface 128 to the outer surface 130 by conduction and from the outer surface 130 of the inner wall 103 to the inner surface 136 of the outer wall 135 by radiative heat transfer. For example, heat may be transferred from the nuclear reactor core 102 to the vessel 105 by, for example, one or more of (e.g., all of) conductive heat transfer, convective heat transfer, and radiative heat transfer. Heat may be transferred from the vessel 105 (e.g., via a surface interfacing with the inner surface 128 of the inner wall 103 of the heat transfer system 125) to the outer wall 135, such as by, for example, radiative heat transfer. In some embodiments, heat transfer from the inner wall 103 to the outer wall 135 may be by (e.g., substantially by, primarily by, entirely by) radiative heat transfer.

Each of the inner wall 103 and the outer wall 135 may independently comprise one or more of steel (e.g., stainless steel, such as austenitic stainless steel (e.g., 304 stainless steel, 316 stainless steel), ferritic stainless steel (e.g., 409 stainless steel, 430 stainless steel), martensitic stainless steel (e.g., 420 stainless steel), duplex stainless steel, precipitation hardened stainless steel (e.g., martensitic 17-4 PH stainless steel)), iron, copper, aluminum, aluminum oxide ($Al_2O_3$), alloys of aluminum (e.g., aluminum alloyed with one or more of copper, magnesium, manganese, silicon, tin, and zinc, such as one or more of 1000 series aluminum (alloys with a minimum of 99 weight percent aluminum), 2000 series aluminum (alloys of aluminum and copper), 3000 series aluminum (alloys of aluminum and manganese), 4000 series aluminum (alloys of aluminum and silicon, also referred to as "silumin"), 5000 series aluminum (alloys of aluminum and magnesium), 6000 series aluminum (alloys of aluminum, magnesium, and silicon), 7000 series aluminum (alloys of aluminum and zinc), or 8000 series aluminum), silver, alloys of nickel (e.g., alloys of nickel and chromium (e.g., alloys including nickel, chromium, and one or more of molybdenum, tungsten, and cobalt, such as INCONEL® 617, INCONEL® 718, alloy 600, alloy X-750), alloys of nickel and manganese), a refractory metal alloy (e.g., alloys of one or more of one or more of molybdenum, niobium, rhenium, tantalum, tungsten, chromium, hafnium, iridium, osmium, ruthenium, titanium, vanadium, and zirconium), cermet materials (composites of a ceramic material (e.g., one or more of tungsten carbide, tungsten nitride, titanium carbide, titanium nitride, silicon carbide, silicon nitride, tantalum carbide, tantalum nitride, niobium carbide, boron carbide) and a metal (e.g., a binder such as one or more of nickel, cobalt, iron, copper, molybdenum), such as one or more of tungsten carbide with one or more of cobalt, nickel, iron, or copper (e.g., WC—Co—Ni), titanium carbide with one or more of cobalt, nickel, iron, or copper (e.g., TiC—Co—Ni), silicon carbide with one or more of cobalt, nickel, iron, copper, or molybdenum), or a carbon-containing material (e.g., a carbon-carbon composite material, such as a carbon fiber reinforced carbon matrix composite material).

In some embodiments, the inner wall 103 comprises steel, such as a stainless steel alloy. In other embodiments, the inner wall 103 comprises aluminum, such as one or more of elemental aluminum, aluminum oxide, or an aluminum alloy. In yet other embodiments, the inner wall 103 comprises silver. In further embodiments, the inner wall 103 comprises an alloy of nickel, a refractory metal alloy, or a cermet material. In additional embodiments, the inner wall 103 comprises a carbon-carbon composite material. In other embodiments, the inner wall 103 comprises silicon carbide.

In some embodiments, the outer surface 130 of the inner wall 103 may include a coating formulated and configured to facilitate a desired amount of heat transfer from the outer surface 130 of the inner wall 103 to the inner surface 136 of the outer wall 135. By way of non-limiting example, the coating may comprise one or more of paint (e.g., a reflective paint, such as a white paint or a silver paint, an absorptive paint, such as a black paint), an oxide (such as aluminum oxide, titanium oxide, tungsten oxide, nickel oxide, chromium oxide), an epoxy material (e.g., a phenolic epoxy), and a plasma coating (e.g., one or more of chromium carbide, chromium oxide, tungsten carbide-cobalt, aluminum oxide, silicon dioxide, zirconium oxide, boron carbide, molybdenum, nickel, cobalt). In some embodiments, the outer surface 130 may be exposed to ion implantation to create a surface that will radiate and absorb thermal radiation. In some such embodiments, the outer surface 130 may be implanted with one or more of nickel, cobalt, iron, copper, silver, molybdenum, aluminum. In some embodiments, the coating imparts hydrophilic properties to the outer surface 130. In other embodiments, the coating imparts hydrophobic properties to the outer surface 130. In some embodiments, the inner surface 136 of the outer wall 135 comprises one or more of the coating materials described above with reference to the coating of the inner wall 103. In some embodiments, the coating of the outer wall 135 is formulated and configured to facilitate increased absorption of radiative energy emitted from the outer surface 130 of the inner wall 103.

The coating on the outer surface 130 may have a thickness within a range from about 0.1 mm to about 5.0 mm, such as from about 0.1 mm to about 0.2 mm, from about 0.2 mm to about 0.4 mm, from about 0.4 mm to about 0.6 mm, from about 0.6 mm to about 0.8 mm, from about 0.8 mm to about 1.0 mm, from about 1.0 mm to about 2.0 mm, from about 2.0 mm to about 3.0 mm, or from about 3.0 mm to about 5.0 mm.

In some embodiments, the outer surface 130 of the inner wall 103 may be modified to induce a desired surface roughness of the outer surface 130. By way of non-limiting example, a surface roughness (e.g., an arithmetic mean roughness value (Ra)) of the outer surface 130 may be within a range from about 0.025 µm Ra to about 50.0 µm Ra, such as from about 0.025 µm Ra to about 0.05 µm Ra, from about 0.05 µm Ra to about 0.10 µm Ra, from about 0.10 µm Ra to about 0.25 µm Ra, from about 0.25 µm Ra to about 0.50 µm Ra, from about 0.50 µm Ra to about 1.0 µm Ra, from about 1.0 µm Ra to about 2.0 µm Ra, from about 2.0 µm Ra to about 4.0 µm Ra, from about 4.0 µm Ra to about 6.0 µm Ra, from about 6.0 µm Ra to about 8.0 µm Ra, from about 8.0 µm Ra to about 10.0 µm Ra, from about 10.0 µm Ra to about 20.0 µm Ra, from about 20.0 µm Ra to about 30.0 µm Ra, or from about 30.0 µm Ra to about 50.0 µm Ra. In some embodiments, the surface roughness is from about 0.025 µm Ra to about 1.0 µm Ra. In other embodiments, the surface roughness is from about 1.0 µm Ra to about 50.0 µm Ra. The surface roughness of the outer surface 130 may be selected such that the outer surface 130 exhibits a desired amount of reflectivity and emissivity. The outer surface 130 may include a surface that has been exposed to grinding, turning, polishing, or sand/grit blasting to impart the desired surface roughness. In addition, in some embodiments, the inner surface 136 of the outer wall 135 may similarly be modified to induce a desired surface roughness thereof, such as a surface roughness within a range from about 0.025 µm Ra to about 50.0 µm Ra, by way of non-limiting example, as described above with reference to the outer surface 130.

In some embodiments, one or more fins 132 are coupled to (extend from) the outer surface 130 of the inner wall 103. In some embodiments, the one or more fins 132 extend from the outer surface 130 into the volume 134 between the outer surface 130 of the inner wall 103 and the inner surface 136 of the outer wall 135. In some embodiments, a gap remains between the fins 132 and the inner surface 136 of the outer wall 135. In other words, in some such embodiments, the fins 132 may not extend from the outer surface 130 of the inner wall 103 all the way to the inner surface 136 of the outer wall 135 and the fins 132 may not contact the inner surface 136. Similarly, in some embodiments, one or more fins 138 are coupled to (extend from) the inner surface 136 of the outer wall 135. In some embodiments, the one or more fins 138 extend from the inner surface 136 into the volume 134 between the outer surface 130 of the inner wall 103 and the inner surface 136 of the outer wall 135. In some embodiments, a gap remains between the fins 138 and the outer surface 130 of the inner wall 103. In other words, a gap remains between the fins 138 and the outer surface 130 of the inner wall 103. In other words, in some such embodiments, the fins 138 may not extend from the inner surface 136 of the outer wall 135 all the way to the outer surface 130 of the inner wall 103 and the fins 138 may not contact the outer surface 130.

The fins 132 may be interspersed with fins 138 extending from the inner surface 136 of the outer wall 135 into the volume 134. In other words, in some embodiments, the fins 132 may be interdigitated with the fins 138. Stated another way, a fin 138 extending from the inner surface 136 of the outer wall 135 may be located between adjacent fins 132 of the inner wall 103. Similarly, a fin 132 extending from the outer surface 130 may be located between adjacent fins 138 of the outer wall 135. In some embodiments, within the volume 134 and along a circumference of the outer surface 130 of the inner wall 103 and the inner surface 136 of the outer wall 135, the respective fins 132, 138 may be spaced such that every other fin 132, 138 is one of the fins 132 and the other of the every other fins 132, 138 is one of the fins 138. Stated in yet another way, within the volume 134, the fins 132 may alternate with the fins 138 and each of the fins 132 may not be directly adjacent one another; rather each of the fins 132 may be spaced from a neighboring one of the fins 132 by one of the fins 138. Similarly, the fins 138 may not be directly adjacent one another and may be spaced from a neighboring one of the fins 138 by one of the fins 132.

In some embodiments, an angular spacing between neighboring fins 132 along a circumference of the outer surface 130 of the inner wall 103 may be within a range from about 0.5° to about 180°, such as from about 0.5° to about 1°, from about 1° to about 2°, from about 2° to about 3°, from about 3° to about 4°, from about 4° to about 5°, from about 5° to about 10°, from about 10° to about 15°, from about 15° to about 20°, from about 20° to about 25°, from about 25° to about 30°, from about 30° to about 45°, from about 45° to about 60°, from about 60° to about 90°, or from about 90° to about 180°. Accordingly, an angle between each fin 132 may be from about 0.5° to about 180°. In some embodiments, an angle between each fin 132 is from about 0.5° to about 30°. In some embodiments, the fins 132 are substantially equally spaced from one another.

Each fin 138 of the fins 138 may be spaced from each other along a circumference of the inner surface 136 of the outer wall 135 within a range from about 0.5° to about 180°, such as from about 0.5° to about 1°, from about 1° to about 2°, from about 2° to about 3°, from about 3° to about 4°, from about 4° to about 5°, from about 5° to about 10°, from about 10° to about 15°, from about 15° to about 20°, from about 20° to about 25°, from about 25° to about 30°, from about 30° to about 45°, from about 45° to about 60°, from about 60° to about 90°, or from about 90° to about 180°. In some embodiments, an angle between each fin 138 is from about 0.5° to about 30°. In some embodiments, the fins 138 are substantially equally spaced from one another.

The fins 132 may be directly coupled to the outer surface 130 of the inner wall 103 by one or more of welding, press fitting, glue, soldering, liquid bonding, or shrink fitting. In other embodiments, the fins 132 are cast with the inner wall 103. Similarly, the fins 138 may be directly coupled to the inner surface 136 of the outer wall 135 by one or more of welding, press fitting, glue, soldering, liquid bonding, or shrink fitting. In other embodiments, the fins 138 are cast with the outer wall 135.

The fins 132 may be configured to facilitate selective removal of heat (e.g., decay heat) from the inner wall 103 to the outer wall 135, which is, in turn, transferred to the surrounding environment 144. For example, the fins 132 may be configured to remove heat from the inner wall 103 to the outer wall 135 at temperatures above normal operating temperatures of the associated nuclear reactor 101. The volume 134 defined between the fins 132 and the fins 138 may be configured to substantially prevent the transmission of heat from the fins 132 to the fins 138 below a desired temperature, such as the normal operating temperature of the associated nuclear reactor 101. Thus, during normal use and operation, the volume 134 is configured to substantially prevent the transmission of heat through the heat transfer system 125, such that heat is removed from the nuclear reactor 101 by the circulation of the coolant fluid 114 and the heated coolant fluid 116 (FIG. 1A), that in turn gives off its heat to the working fluid 120 to form the heated working fluid 122 that is, in turn, used to operate the heat engine 124 that spins the electric generator 126 to generates electricity. For example, a size of the volume 134, such as the distance between the fins 132 and the fins 138 may be selected to substantially prevent the transmission of heat across the volume below a desired temperature and to facilitate the transmission of heat across the volume above the desired temperature. In some embodiments, a fill material in the volume 134, such as a gas (e.g., air, nitrogen, helium, argon, carbon dioxide, etc.), a vacuum, a partial vacuum, etc., may also be configured to further define the heat transmission characteristics of the heat transfer system 125. For example, the combination of the size of the volume 134 and the fill material or absence of fill material may define the desired temperature where the volume 134 may begin to facilitate the transmission of heat from the fins 132 to the fins 138. The material composition of the inner wall 103, the fins 132, the outer wall 135, the fins 138, and coatings and/or surface properties may also be selected to define the desired temperature where heat begins to be substantially transferred from the inner wall 103 and fins 132 to the fins 138 and the outer wall 135. In other words, the surface characteristics of the outer surface 130 of the inner wall 103 and of its attached fins 132 and the surface characteristics of the inner surface 136 of the outer wall 135 and of its attached fins 138 may be selected to define the desired temperature at which heat begins to be substantially and efficiently transferred from the inner wall 103 and fins 132 to the outer wall 135 and fins 138.

During emergency or shut down situations, such as when the nuclear reactor 101 is out of thermal balance (e.g., during periods when circulation of the working fluid 120 has ceased or when the coolant fluid 114 is removing less heat than is generated by the fuel 104 of the reactor core 102 or when the temperature of the nuclear reactor 101 (e.g., the vessel 105) exceeds a predetermined temperature), the nuclear reactor 101 and the heat transfer system 125 may be structured and arranged to facilitate removal of heat from the nuclear reactor 101 to the outer wall 135 and to the environment 144.

Since the primary mode of heat transfer from the nuclear reactor 101 to the outer wall 135 is through radiative heat transfer (e.g., radiative heat transfer from the inner wall 103 to the outer wall 135), the rate of heat transfer may increase by the fourth power with increasing temperature, according to the Stephan-Boltzmann Law (i.e., $q = \sigma T^4 \cdot A$, wherein q is the rate of heat transfer per unit time (W), $\sigma$ is the Stephan-Boltzmann Constant, T is the absolute temperature in Kelvin (K) of the outer surface 130 and the fins 132, and A is the area of the emitting body ($m^2$) (e.g., the area of the outer surface 130 and the fins 132)). Accordingly, the outer surface 130 including the fins 132 may be structured and configured to remove heat from the nuclear reactor 101, the rate of which removal increases to the fourth power of the temperature of the outer surface 130 and the fins 132. Accordingly, with increasing temperature of the nuclear reactor 101, the temperature of the outer surface 130 and the fins 132 may exhibit a corresponding increase in temperature and the rate of heat removal from the nuclear reactor 101 may change at nearly the fourth power of the temperature of the outer surface 130 and the fins 132, which may approximate the temperature of the nuclear reactor 101 (depending on a temperature drop between the vessel 105 and the inner wall 103).

In some such embodiments, the outer surface 130 and the fins 132 may be sized and shaped such that negligible heat is removed from the nuclear reactor 101 by thermal radiation at temperatures of the nuclear reactor 101 during normal use and operation of the reactor core 102 while sufficient heat is removed from the nuclear reactor 101 during emergency and other situations where the temperature of the nuclear reactor 101 is increased beyond conventional operating temperatures of the nuclear reactor 101. In some embodiments, the heat transfer system 125 may be configured to be substantially thermally insulative at temperatures at or less than the normal operating temperature of the nuclear reactor 101, such as at temperatures less than about 900° C., less than about 800° C., less than about 700° C., less than about 600° C., less than about 500° C., or less than about 300° C. The heat transfer system 125 may be thermally conductive at temperatures greater than the normal operating temperature of the nuclear reactor 101.

The fins 132 may be formed of and include one or more of the materials described above with reference to the inner wall 103. The fins 132 may comprise one or more of steel, iron, copper, aluminum, aluminum oxide ($Al_2O_3$), alloys of aluminum, alloys of nickel and manganese, a refractory metal alloy, cermet materials, silicon carbide, or a carbon-containing material. In some embodiments, the fins 132 comprise steel, such as a stainless steel alloy. In other embodiments, the fins 132 comprise aluminum, such as one or more of elemental aluminum, aluminum oxide, or an aluminum alloy. In yet other embodiments, the fins 132 comprise silver. In further embodiments, the fins 132 comprise an alloy of nickel, a refractory metal alloy, or a cermet material. In additional embodiments, the fins 132 comprise a carbon-carbon composite material. In some embodiments, the fins 132 comprise the same material composition as the outer surface 130 of the inner wall 103. In other embodiments, the fins 132 comprise a different material composition than the outer surface 130.

The fins 138 may comprise one or more of the materials described above with reference to the fins 132. In some embodiments, the fins 138 comprise the same material composition as the fins 132. In other embodiments, the fins 138 comprise a different material composition than the fins 132.

Figure 1C:
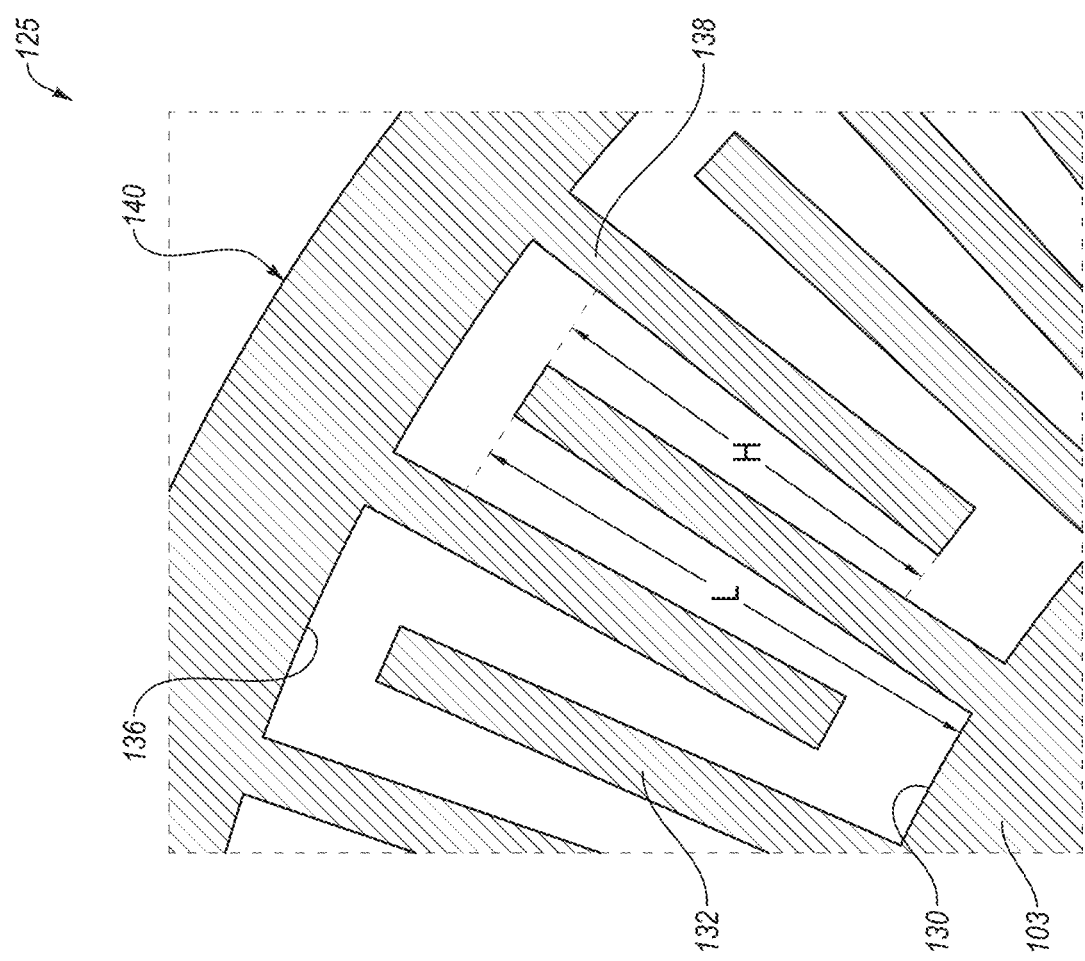
FIG. 1C illustrates an enlarged cross-section of a portion of the nuclear reactor of FIGS. 1A and 1B.

FIG. 1C is an expanded view of a portion of the heat transfer system 125 illustrating box C of FIG. 1B. With reference to FIG. 1C, an amount of overlap H between the fins 132 extending from the outer surface 130 of the inner wall 103 and the fins 138 extending from the inner surface 136 of the outer wall 135 may be within a range from about 0.1 percent of a length L of the fin 132 to about 99 percent a length L of the fin 132, such as from about 0.1 percent to about 10 percent, from about 10 percent to about 20 percent, from about 20 percent to about 30 percent, from about 30 percent to about 50 percent, from about 50 percent to about 70 percent, from about 70 percent to about 80 percent, from about 80 percent to about 90 percent of the length L of the fin 132, or from about 90 percent to about 99 percent. In some embodiments, the overlap H is selected such that thermal expansion of the components of the heat transfer system 125 results in direct physical thermal contact of the fins 132 with the inner surface 136 of the outer wall 135 when a temperature of the inner wall 103 exceeds a pre-determined threshold. In other embodiments, the overlap H is selected such that direct physical contact of the fins 132 with the inner surface 136 of the outer wall 135 is precluded.

In some embodiments, the length L of the fins 132 may be substantially equal to the length of the fins 138. In other embodiments, the length L of the fins 132 is different from the length of the fins 138. In some embodiments, the length L of the fins 132 is substantially uniform. In other embodiments, one or more of the fins 132 has a length L different than the length L of at least another of the fins 132. In some embodiments, the length of the fins 138 is substantially uniform. In other embodiments, one or more of the fins 138 has a length different than the length of at least another of the fins 138.

In yet other embodiments, the length L of the fins 132 may be different from a length of the fins 138. For example, each of the fins 132 may have a greater length L than each of the fins 138. In yet other embodiments, each of the fins 138 may have a greater length than each of the fins 132.

In some embodiments, the overlap H may affect a view factor $F_{130 \rightarrow 136}$ from the outer surface 130 and the fins 132 to the inner surface 136 and the fins 138 (which may also be represented as $F_{130+132 \rightarrow 136+138}$). The view factor $F_{130 \rightarrow 136}$ may be defined as a proportion of radiation that leaves the outer surface 130 of the inner wall 103 and the surfaces of the fins 132 that strikes the surfaces of the fins 138 and the inner surface 136 of the outer wall 135. In some embodiments, the view factor $F_{130 \rightarrow 136}$ may be within a range from about 0.10 to about 0.99, such as from about 0.10 to about 0.20, from about 0.20 to about 0.30, from about 0.30 to about 0.40, from about 0.40 to about 0.50, from about 0.50 to about 0.60, from about 0.60 to about 0.70, from about 0.70 to about 0.80, from about 0.80 to about 0.90, or from about 0.90 to about 0.99. In some embodiments, the length L, the spacing between the fins 132 and the fins 138, the number of the fins 132, 138, and the overlap of the fins 132, 138 may be selected to impart a desired view factor $F_{130 \rightarrow 136}$. In some embodiments, the length L, the spacing between the fins 132 and the fins 138, the number of the fins 132, 138, and the overlap H of the fins 132, 138 may be selected to impose that no physical contact between the inner wall 103 and associated fins 132 and outer wall 135 and associated fins 138 may occur at operating temperatures taking thermal expansion phenomena into account. In some embodiments, the overlap H is selected such that thermal expansion of the components of the heat transfer system 125 results in the fins 132 becoming in physical thermal contact with the inner surface 136 of the outer wall 135 when a temperature of the inner wall 103 exceeds a pre-determined threshold.

The fins 132 may increase the surface area from which radiative heat from the outer surface 130 of the inner wall 103 is emitted. Accordingly, the fins 132 increase the surface area through which radiative heat transfer occurs. In addition, the fins 138 may increase the surface area of the inner surface 136 of the outer wall 135 and the surface area by which radiative heat transfer from the inner wall 103 is received.

Figure 2:
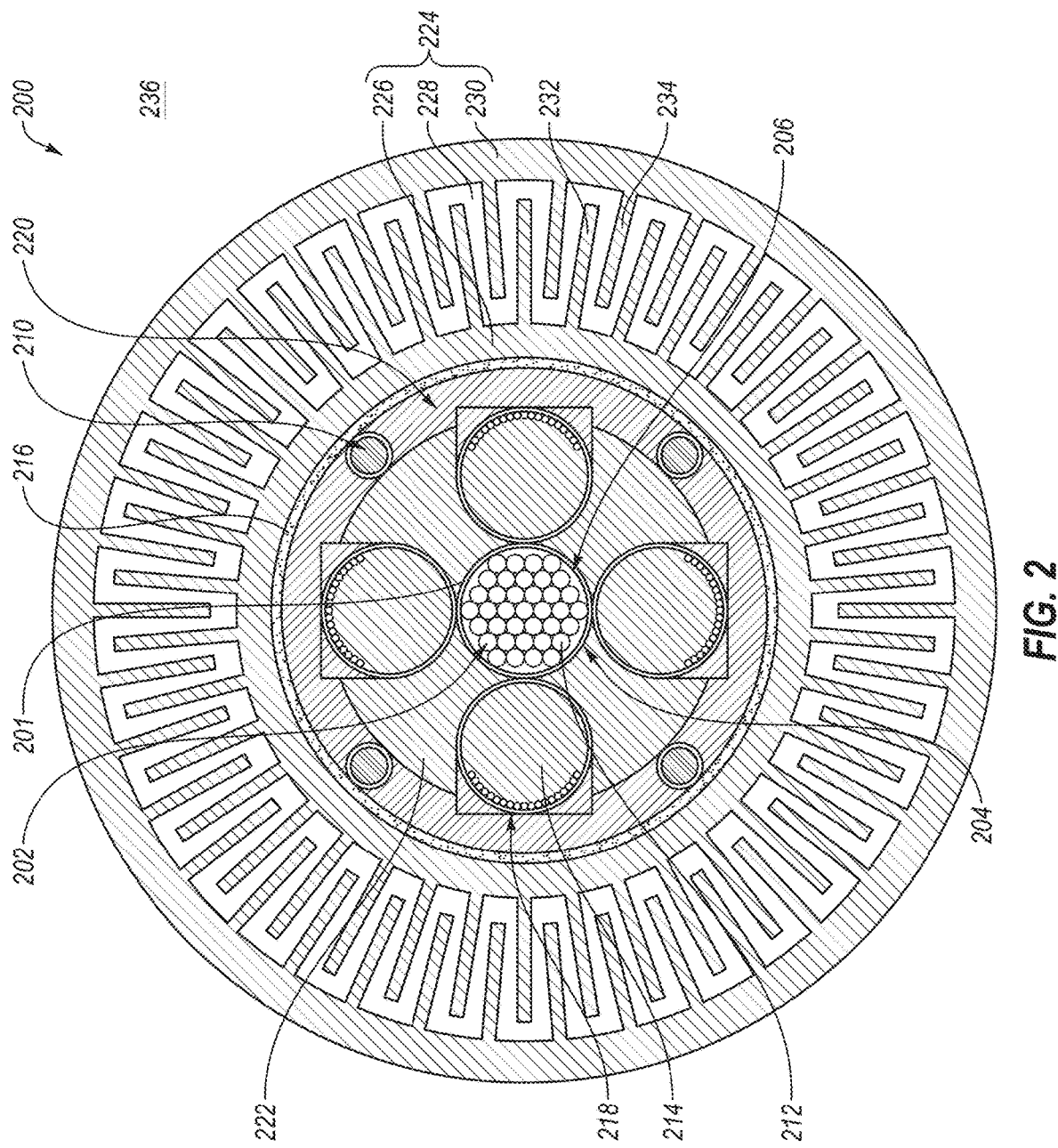
FIG. 2 illustrates a cross-sectional view of a nuclear reactor in accordance with embodiments of the disclosure.

FIG. 2 illustrates a cross-sectional view of a reactor 200. The fuel elements 212 are surrounded by a core barrel or core shroud 201. Together, the fuel and the core shroud 201 define the core 204 of the reactor. Any material within the volume delineated by the core shroud 201 would be part of the core 204. The space within the core shroud 201, is the fuel chamber, the core chamber or the core region. The reactor 200 may include a fuel chamber 202 enclosed within a core shroud 201 in a central portion of the reactor 200. The fuel chamber or core 204 may include space for multiple fuel elements 212, such as fuel rods, fuel pins, fuel spheres or fuel pellets, etc. The fuel chamber 202 enclosure may also define space around the fuel elements 212 to enable passage of the heat transmission fluid (e.g., coolant fluid 114) through the fuel chamber 202 to collect heat from the fuel elements 212 as the fuel undergoes fission chain reactions. The fuel elements 212 may include a material that contains a fissile nuclide, such as uranium zirconium hydride (U—ZrH), uranium oxycarbide ($UC_xO_y$), uranium carbide ($UC_x$), uranium oxide ($UO_2$), uranium-235, uranium 233, plutonium-239, thorium, etc., configured to facilitate a fission chain reaction. The fuel may be selected from a material combination that displays substantial negative temperature reactivity coefficients. Materials having negative temperature reactivity coefficients are materials in which the rate of fission chain reactions decreases when the temperature increases, and in which the rate of fission chain reactions increases when the temperature decreases.

The reactor 200 may include down tubes 210 arranged outside the core 204 and/or fuel chamber 202. The heat transmission fluid may be configured to flow upward through the fuel chamber 202 before passing through a heat exchanger (e.g., heat exchanger 118) to heat a working fluid (e.g., working fluid 120). The heat transmission fluid may then return to a bottom of the core 204 through the down tubes 210. In some embodiments, the heat transmission fluid flows through the reactor 200 through natural convection. For example, as the heat transmission fluid is heated in the fuel chamber 202, the heated heat transmission fluid rises through the fuel chamber 202. Then after the heat transmission fluid is cooled in the heat exchanger, the cooled heat transmission fluid flows down through the down tubes 210. The fuel chamber 202, heat exchanger, and down tube 210 may form a closed fluid loop.

The selection of fuel with a suitable reactivity coefficient may cause the reactor 200 to self-regulate. For example, if greater amounts of heat are removed from the heat transmission fluid (e.g., in a high load condition), the heat transmission fluid may return to the core at a lower temperature than if smaller amounts of heat are removed. The cooler fluid temperature may then induce a rise in reactivity in the fuel and hence increase the thermal power that is generated in the core. Alternatively, if lower amounts of heat are removed from the heat transmission fluid (e.g., in a low load condition), the heat transmission fluid may return to the core chamber at a higher temperature than otherwise and then flow through the fuel chamber 202 while initially at the higher temperature which causes it to extract less heat from the fuel. This causes the fuel temperature to rise and the thermal power generated is reduced in the core due to the negative reactivity of the fuel.

The natural convection cooling of the reactor may further enhance the self-regulating behavior of the reactor. However, the self-regulating effect would occur even if the coolant flow were not governed by natural circulation. For example, the self-regulating effect created by the negative reactivity of the fuel will also change the power output of the reactor 200 in an embodiment with a constant flow rate imposed by a pumping element. In each case, the coolant passes through the core, having discharged heat into the heat exchanger. If less heat was discharged, the coolant returns to the core at a higher temperature and would extract less heat from the core which causes negative temperature feedback, resulting in a decrease of the rate of fission chain reactions and a decrease in thermal energy generation. Conversely, if more energy is removed by the heat exchanger, the coolant fluid returns to the core at a lower temperature. The temperature feedback causes an increase in the rate of fission reactions, and an increase in thermal power generation. These responses naturally follow changes in load demand: as load demand increases and more electricity is generated and delivered to the grid, the coolant becomes cooler and the positive reactivity ensues. If the grid demands less load or rejects the load altogether, the heat engine brakes naturally, less electricity is generated. Thus, less heat is extracted from the coolant, returning it to the core at a higher temperature. This results in negative reactivity in the core and in a power generation decrease. The brake action on the heat engine and the release of the brake may be effected by a passive natural electromagnetic feature.

The fuel elements 212 in the fuel chamber 202 may be held in place by a core block that may comprise a block of structural material or one or more moderator materials in the form of one or more moderator inserts 206. The moderator inserts 206 may be positioned between the fuel elements 212 and the side of the fuel chamber 202. In some embodiments, the moderator inserts 206 may be formed from a neutron reflective material such as beryllium (Be), beryllium metals, beryllium oxide (BeO), graphite, steel (e.g., stainless steel), a metal hydride, beryllium carbide, etc. The moderator insert 206 may substantially limit the number of neutrons leaving the fuel chamber 202, which may increase the efficiency of the fission chain reaction. The moderator inserts 206 may also concentrate flow of the heat transmission fluid to the areas around the fuel elements 212 by substantially limiting open areas around the perimeter of the fuel chamber 202.

Core reflectors 222 and 220 may substantially surround the fuel chamber 202. The core reflectors 222 and 220 may be formed from a material configured and composed of elements such as to serve a shielding function and to substantially reflect neutrons back into the fuel chamber 202, substantially limiting the number of neutrons and/or radiation leaving the fuel chamber 202. For example, the core reflectors 222 and 220 may include materials, such as beryllium (Be), beryllium oxide (BeO), graphite, steel (e.g., stainless steel), tungsten, beryllium carbide, other carbide materials, etc. The core reflector 222 may have a thickness of between about 50 cm (19.69 in) and about 80 cm (31.50 in), or between about 60 cm (23.62 in) and about 70 cm (27.56 in), or about 66 cm (25.98 in). The secondary core reflector 220 may have a thickness in a range from about 30 cm (11.81 in) to about 70 cm (27.53 in), such as from about 40 cm (15.75 in) to about 60 cm (23.62 in) or about 50 cm (19.69 in).

Reaction control devices 214 may be positioned within the core reflector 222, such that at least a portion of the surface of each of the reaction control devices 214 is proximate the fuel chamber 202. The reaction control devices 214 may be formed from a material similar to the material of the core reflector 222 and/or 220. Therefore, the reaction control devices 214 may include materials, such as beryllium, beryllium oxide, graphite, steel, tungsten, carbide, etc. At least a portion of an outer surface of the reaction control devices 214 may include a neutron absorbing material 218, such as boron carbide ($B_4C$), cadmium, hafnium, gadolinium, cobalt, samarium, titanium, dysprosium, erbium, europium, molybdenum, ytterbium, etc. The reaction control devices 214 may be rotationally secured within the core reflectors 222 and 220, such that the reaction control devices 214 may rotate changing which portion of the surface of the reaction control device 214 is proximate the fuel chamber 202. For example, positioning the neutron absorbing material 218 proximate the fuel chamber 202 may slow or stop the fission chain reaction within the fuel chamber 202 by substantially absorbing the free neutrons. Whereas, positioning the surface including the neutron absorbing material 218 away from the fuel chamber 202 may facilitate the fission chain reaction by positioning a neutron reflective material between the fuel chamber 202 and the neutron absorbing material 218, such that the free neutrons may continue to cause fission in other atoms of the fuel element 212 within the fuel chamber 202.

The core 204 and core reflectors 220 and 222 may be surrounded by a reactor vessel 216 defining the inner boundary of a secondary heat transfer system 224 including an inner wall 226 with attached fins 232, an outer wall 230 with attached fins 234, and a volume 228 between the two walls and their respective attached fins. The down tubes 210 may pass through the secondary core reflector 220. The secondary core reflector 220 may be configured to contain components of the closed fluid loop of the heat transmission fluid to substantially protect the reactor vessel 216 from overheating by cooling it while preheating the coolant fluid prior to its movement through the core 204. The secondary heat transfer system 224 may be sized such that if the closed fluid loop of the heat transmission fluid leaks, becomes blocked, or malfunctions and the reactor shuts down, the amount of residual heat, known as decay heat, that is generated within the core 204 may be removed effectively by the heat transfer system 224 such that the fuel element 212 and the reactor vessel 216 remain below their limit design temperatures.

The reactor vessel 216 may be surrounded by the heat transfer system 224. Similar to the heat transfer system 125 discussed above, the heat transfer system 224 may include an inner wall 226 and an outer wall 230 defining a volume 228 therebetween. The inner wall 226 may include multiple fins 232 extending radially therefrom into the volume 228 between the inner wall 226 and the outer wall 230. The outer wall 230 may also include multiple fins 234 extending radially therefrom into the volume 228 between the outer wall 230 and the inner wall 226. The fins 234, 234 may be interlaced, such that a fin 234 extending from the outer wall 230 is positioned between two adjacent fins 232 extending from the inner wall 226. Similarly, a fin 232 extending from the inner wall 226 may be positioned between two adjacent fins 234 extending from the outer wall 230. The fins 232, fins 234 may also be arranged such that the fins 232 do not directly contact the fins 234 or the outer wall 230 and such that the fins 234 do not directly contact the fins 232 or the inner wall 226.

The volume 228 defined between the inner wall 226 and the outer wall 230 may also separate the fins 232 from the fins 234. In some embodiments, the volume 228 is filled with air (e.g., a composition including about 78 atomic percent nitrogen, about 21 atomic percent oxygen, and about 1 atomic percent argon). In other embodiments, the volume 228 may include one or more materials (e.g., gases) having a thermal conductivity less than a thermal conductivity of air, such as one or more of argon or carbon dioxide. In yet other embodiments, the volume 228 is under vacuum or a partial vacuum.

In some embodiments, at least a portion of the outer wall 230 may be in contact with the surrounding environment 236. The surrounding environment 236 may comprise an ultimate heat sink for the nuclear reactor 200 such as, for example, the Earth (e.g., the ground), the atmosphere (e.g., the air above the ground and in the sky), water, a body of water, or another heat sink.

Heat may be transferred from the core 204 and core reflectors 220, 222 via the reactor vessel 216 to the inner wall 226 of the heat transfer system 224. Heat may be transferred through the inner wall 226 by conduction and from the inner wall 226 to the outer wall 230 through the volume 228 by radiative heat transfer.

Each of the inner wall 226 and the outer wall 230 may independently comprise one or more of steel (e.g., stainless steel, such as austenitic stainless steel (e.g., 304_stainless steel, 316 stainless steel), ferritic stainless steel (e.g., 409 stainless steel, 430 stainless steel), martensitic stainless steel (e.g., 420 stainless steel), duplex stainless steel, precipitation hardened stainless steel (e.g., martensitic 17-4 PH stainless steel)), iron, copper, aluminum, aluminum oxide ($Al_2O_3$), alloys of aluminum (e.g., aluminum alloyed with one or more of copper, magnesium, manganese, silicon, tin, and zinc, such as one or more of 1000 series aluminum (alloys with a minimum of 99 weight percent aluminum), 2000 series aluminum (alloys of aluminum and copper), 3000 series aluminum (alloys of aluminum and manganese), 4000 series aluminum (alloys of aluminum and silicon, also referred to as "silumin"), 5000 series aluminum (alloys of aluminum and magnesium), 6000 series aluminum (alloys of aluminum, magnesium, and silicon), 7000 series aluminum (alloys of aluminum and zinc), or 8000 series aluminum), silver, alloys of nickel (e.g., alloys of nickel and chromium (e.g., alloys including nickel, chromium, and one or more of molybdenum, tungsten, and cobalt, such as INCONEL® 617, INCONEL® 718, alloy 600, alloy X-750), alloys of nickel and manganese), a refractory metal alloy (e.g., alloys of one or more of one or more of molybdenum, niobium, rhenium, tantalum, tungsten, chromium, hafnium, iridium, osmium, ruthenium, titanium, vanadium, and zirconium), cermet materials (composites of a ceramic material (e.g., one or more of tungsten carbide, tungsten nitride, titanium carbide, titanium nitride, silicon carbide, silicon nitride, tantalum carbide, tantalum nitride, niobium carbide, boron carbide) and a metal (e.g., a binder such as one or more of nickel, cobalt, iron, copper, molybdenum), such as one or more of tungsten carbide with one or more of cobalt, nickel, iron, or copper (e.g., WC—Co—Ni), titanium carbide with one or more of cobalt, nickel, iron, or copper (e.g., TiC—Co—Ni), silicon carbide with one or more of cobalt, nickel, iron, copper, or molybdenum), or a carbon-containing material (e.g., a carbon-carbon composite material, such as a carbon fiber reinforced carbon matrix composite material).

In some embodiments, one or more surfaces of the inner wall 226 or the outer wall 230 may include a coating formulated and configured to facilitate a desired amount of heat transfer between the inner wall 226 and the outer wall 230. By way of non-limiting example, the coating may include one or more of paint (e.g., a reflective paint, such as a white paint or a silver paint, an absorptive paint, such as a black paint), an oxide (such as aluminum oxide, titanium oxide, tungsten oxide, nickel oxide, chromium oxide), an epoxy material (e.g., a phenolic epoxy), and a plasma coating (e.g., one or more of chromium carbide, chromium oxide, tungsten carbide-cobalt, aluminum oxide, silicon dioxide, zirconium oxide, boron carbide, molybdenum, nickel, cobalt). In some embodiments, the outer surface 130 may be exposed to ion implantation to create a surface that will radiate and absorb thermal radiation. In some such embodiments, the outer surface (e.g., outer surface 130 (FIG. 1C)) of the inner wall 226 may be implanted with one or more of nickel, cobalt, iron, copper, silver, molybdenum, aluminum or other element.

The coating on the one or more surfaces may have a thickness within a range from about 0.1 mm to about 5.0 mm, such as from about 0.1 mm to about 0.2 mm, from about 0.2 mm to about 0.4 mm, from about 0.4 mm to about 0.6 mm, from about 0.6 mm to about 0.8 mm, from about 0.8 mm to about 1.0 mm, from about 1.0 mm to about 2.0 mm, from about 2.0 mm to about 3.0 mm, or from about 3.0 mm to about 5.0 mm.

In some embodiments, one or more surfaces of the inner wall 226 or the outer wall 230 may be modified to induce a desired surface roughness of the one or more surfaces. By way of non-limiting example, a surface roughness (e.g., an arithmetic mean roughness value (Ra)) of the outer surface (e.g., outer surface 130 (FIG. 1C)) may be within a range from about 0.025 μm Ra to about 50.0 μm Ra, such as from about 0.025 μm Ra to about 0.05 μm Ra, from about 0.05 μm Ra to about 0.10 μm Ra, from about 0.10 μm Ra to about 0.25 μm Ra, from about 0.25 μm Ra to about 0.50 μm Ra, from about 0.50 μm Ra to about 1.0 μm Ra, from about 1.0 μm Ra to about 2.0 μm Ra, from about 2.0 μm Ra to about 4.0 μm Ra, from about 4.0 μm Ra to about 6.0 μm Ra, from about 6.0 μm Ra to about 8.0 μm Ra, from about 8.0 μm Ra to about 10.0 μm Ra, from about 10.0 μm Ra to about 20.0 μm Ra, from about 20.0 μm Ra to about 30.0 μm Ra, or from about 30.0 μm Ra to about 50.0 μm Ra. In some embodiments, the surface roughness is from about 0.025 μm Ra to about 1.0 μm Ra. In other embodiments, the surface roughness is from about 1.0 μm Ra to about 50.0 μm Ra. The surface roughness of the one or more surfaces may be selected such that the one or more surfaces exhibit a desired amount of reflectivity and emissivity.

In some embodiments, an angular spacing between neighboring fins 232 along a circumference of the inner wall 226 may be within a range from about 0.5° to about 180°, such as from about 5° to about 10°, from about 10° to about 15°, from about 15° to about 20°, from about 20° to about 25°, from about 25° to about 30°, from about 30° to about 45°, from about 45° to about 60°, from about 60° to about 90°, or from about 90° to about 180°. Accordingly, an angle between each consecutive pair of fins 232 may be from about 0.5° to about 180°. In some embodiments, an angle between each pair of adjacent fins 232 is from about 0.5° to about 30°. In some embodiments, the fins 232 are substantially equally spaced from one another.

Each fin 234 of the fins 234 may be spaced from each other along a circumference of the outer wall 230 within a range from about 0.5° to about 180°, such as from about 5° to about 10°, from about 10° to about 15°, from about 15° to about 20°, from about 20° to about 25°, from about 25° to about 30°, from about 30° to about 45°, from about 45° to about 60°, from about 60° to about 90°, or from about 90° to about 180°. In some embodiments, an angle between each pair of adjacent fins 234 is from about 0.5° to about 30°. In some embodiments, the fins 234 are substantially equally spaced from one another.

The fins 232 may be directly coupled to the inner wall 226 by one or more of welding, press fitting, glue, soldering, liquid bonding, or shrink fitting. In other embodiments, the fins 232 are cast with the inner wall 226. Similarly, the fins 234 may be directly coupled to the outer wall 230 by one or more of welding, press fitting, glue, soldering, liquid bonding, or shrink fitting. In other embodiments, the fins 234 are cast with the outer wall 230.

The fins 232 may be configured to facilitate selective removal of heat (e.g., decay heat) from the inner wall 226 to the outer wall 230, which is, in turn, transferred to the surrounding environment 236. For example, the fins 232 may be configured to remove heat from the inner wall 226 to the outer wall 230 at temperatures above normal operating temperatures of the associated nuclear reactor 200. For example, the volume 228 defined between the fins 232 and the fins 234 may be configured to substantially prevent the transmission of heat from the fins 232 to the fins 234 at and below a desired temperature, such as the normal operating temperature of the associated nuclear reactor 200. For example, a size and shape of the volume 228 or a fill material in the volume 228 or an induced low pressure or vacuum may be configured to define the desired temperature where the volume 228 may begin to facilitate the transmission of heat from the fins 232 to the fins 234. The material composition of the inner wall 226, the fins 232, the outer wall 230, the fins 234, and coatings and/or surface properties may also be selected to define the desired temperature where heat begins to be substantially transferred from the inner wall 226 and fins 232 to the fins 234 and the outer wall 230. The fins 232 may be formed of and include one or more of the materials described above with reference to the inner wall 226. In some embodiments, the fins 232 comprise the same material composition as the inner wall 226. In other embodiments, the fins 232 comprise a different material composition than the inner wall 226.

The fins 234 may comprise one or more of the materials described above with reference to the fins 232. In some embodiments, the fins 234 comprise the same material composition as the fins 232. In other embodiments, the fins 234 comprise a different material composition than the fins 232.

FIGS. 3-5B illustrate embodiments of example configurations and arrangements of different heat transfer systems similar to the heat transfer system 125 and the heat transfer system 224 that may be used with or connected to a nuclear reactor, such as nuclear reactor 101 or nuclear reactor 200.

Figure 3:
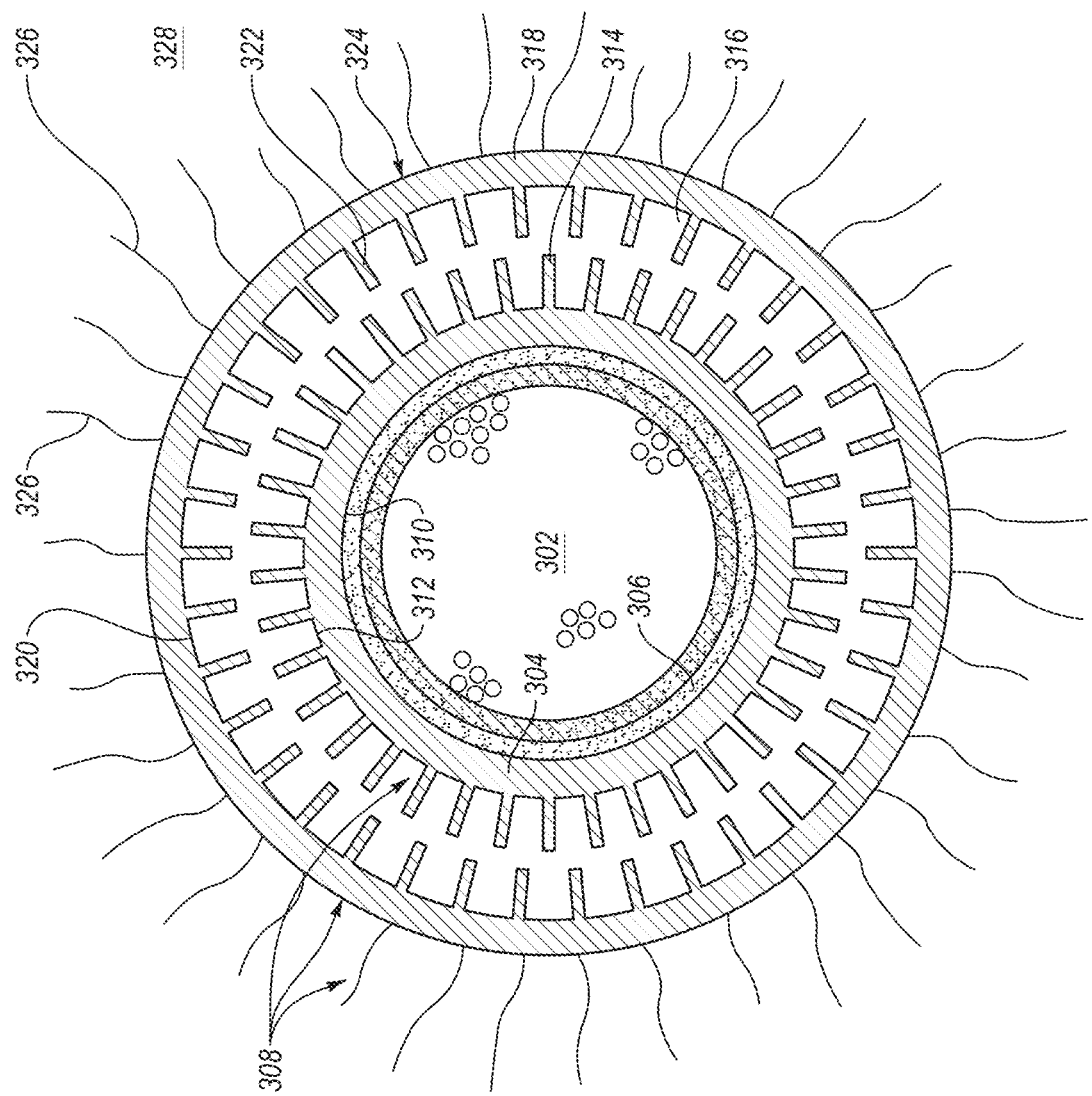
FIG. 3 illustrates a cross-sectional view of a nuclear reactor in accordance with embodiments of the disclosure.

FIG. 3 includes a simplified cross-sectional view of a heat transfer system 308, in accordance with embodiments of the disclosure. The heat transfer system 308 is substantially similar to the heat transfer system 125 of FIG. 1B and the heat transfer system 224 of FIG. 2. For example, the heat transfer system 308 includes an inner wall 304 and an outer wall 318 separated by a volume 316. The inner wall 304 includes an inner surface 310 configured to receive heat from a vessel 306 enclosing a reactor core 302. The inner wall 304 also includes fins 314 extending from an outer surface 312 thereof into the volume 316. The inner wall 304 is configured to transfer heat by radiation through the volume 316 to the inner surface 320 of the outer wall 318 and to the fins 322 extending from an inner surface 320 of the outer wall 318. The outer wall 318 is then configured to transfer heat to the surrounding environment 328 through the outer surface 324 of the outer wall 318. The outer surface 324 of the outer wall 318 may also include heat transfer structures 326 extending into the environment 328 to facilitate more efficient transmission of heat.

In the embodiment illustrated in FIG. 3, the fins 314 and the fins 322 differ from the fins 132, 138, 232, 234 of the embodiments illustrated in FIGS. 1B-2 in that the fins 314 do not exhibit an overlap H with the fins 322. Rather, a gap G may be defined between an end portion of the fins 314 and an end portion of the fins 322. In other words, the fins 314 may be spaced from the fins 322 by the gap G in the radial direction. In some such embodiments, the heat transfer system 308 may exhibit thermally insulative properties at higher temperatures compared to heat transfer systems with an overlap H between the fins 314 and the fins 322 while exhibiting thermally conductive properties above a threshold temperature greater than a temperature at which heat transfer systems including an overlap H exhibit thermally transmissive properties.

Figure 4A:
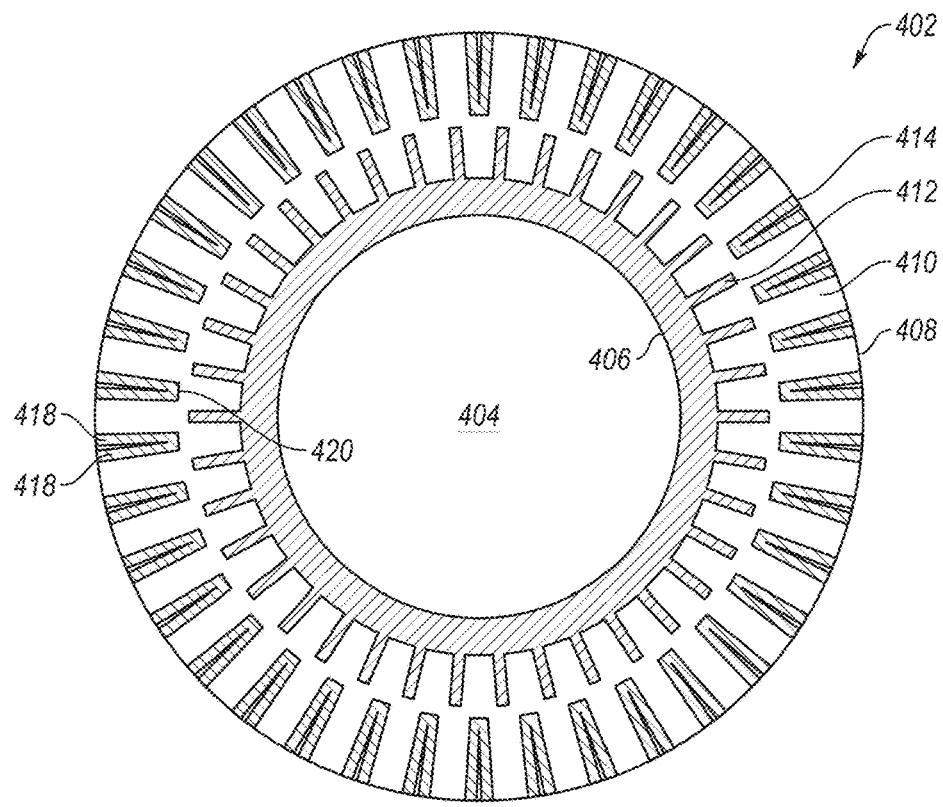
FIG. 4A illustrates a cross-sectional view of a nuclear reactor in accordance with embodiments of the disclosure.
Figure 4B:
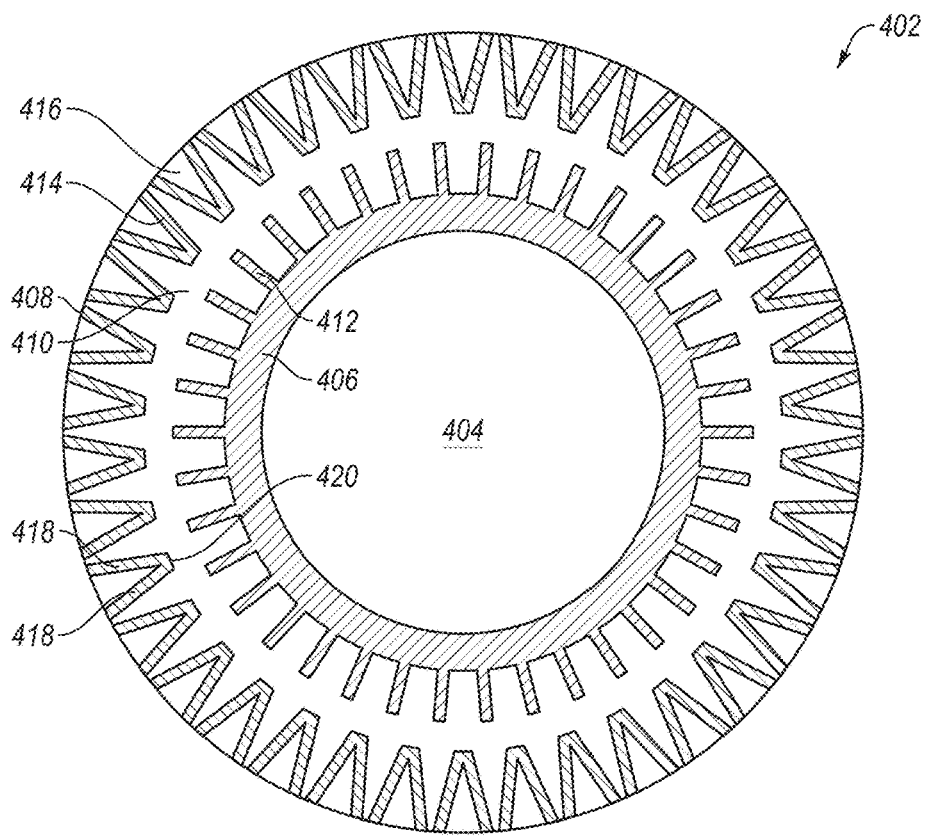
FIG. 4B illustrates a cross-sectional view of the nuclear reactor of FIG. 4A with the heat transfer system in an expanded configuration.

FIGS. 4A and 4B illustrate another embodiment of a heat transfer system 402 surrounding a reactor core 404. In some embodiments, the heat transfer system 402 is configurable. For example, the heat transfer system 402 may be configured to change one or more parameters to change the heat transfer properties of the heat transfer system 402. In the embodiment illustrated in FIGS. 4A and 4B, an outer wall 408 of the heat transfer system 402 is configured to be expandable (e.g., to increase a diameter of the outer wall 408), such that the outer wall 408 may move toward or away from the inner wall 406 effectively changing a size of the volume 410 defined between the inner wall 406 and the outer wall 408 as well as changing a spacing and overlap between fins 412 extending from the inner wall 406 and fins 414 extending from the outer wall 408 and changing the view factor between the two sets of walls and the associated fins. Increasing or decreasing the volume 410 and/or the space between the inner wall 406 and the outer wall 408 and increasing or decreasing the view factor between the inner side and the outer side may decrease or increase the insulative properties of the heat transfer system 402, such that the heat transfer system 402 will enhance or impede the transfer of heat to the surrounding environment at a higher temperature. An increase of the volume 410 concomitant to an increase of the diameter of the outer wall 408 increases the surface area by which the outer wall 408 absorbs heat received as thermal radiation from the inner wall 406. This increase may enhance the outer wall's ability to absorb heat. Also, all other factors being equal, the diameter increase results in a lower outer wall inner surface average temperature and reduced re-emission of thermal energy from that surface, which enhances the net heat transfer from the inner wall to the outer wall. The increase in the attached fins dimensions also enhances the heat transfer. Conversely, as the outer wall is returned to a smaller diameter position and its attached fins are telescoped into smaller depth, the heat transfer decreases. The movement of the wall in either direction and the adjustment of the fins (telescoping extension or telescoping collapse, or unfolding or folding) facilitates a fine-tuning of the heat transfer properties.

In the embodiment illustrated in FIGS. 4A and 4B, the outer wall 408 is configured to expand (e.g., increase in diameter) or contract (e.g., decrease in diameter) through an accordion arrangement. Each of the fins 414 extending from the outer wall 408 include two panels 418 joined at a vertex 420. An angle 416 is formed between the panels 418 at the vertex 420. As the outer wall 408 expands the angle 416 between the panels 418 at each of the fins 414 increases. As the outer wall 408 retracts the angle 416 between the panels 418 at each of the fins 414 decreases. The angle 416 may also be made to increase or decrease without moving the wall outward or inward. An increase of the angle increases the view factor between the inner wall and fins and the outer ones, thus increasing heat transfer, while a decrease of the angle would decrease heat transfer. In some configurations, a decrease of the angle extends the outer wall fins towards the inner wall and increases the view factor thus increasing heat transfer.

Figure 5A:
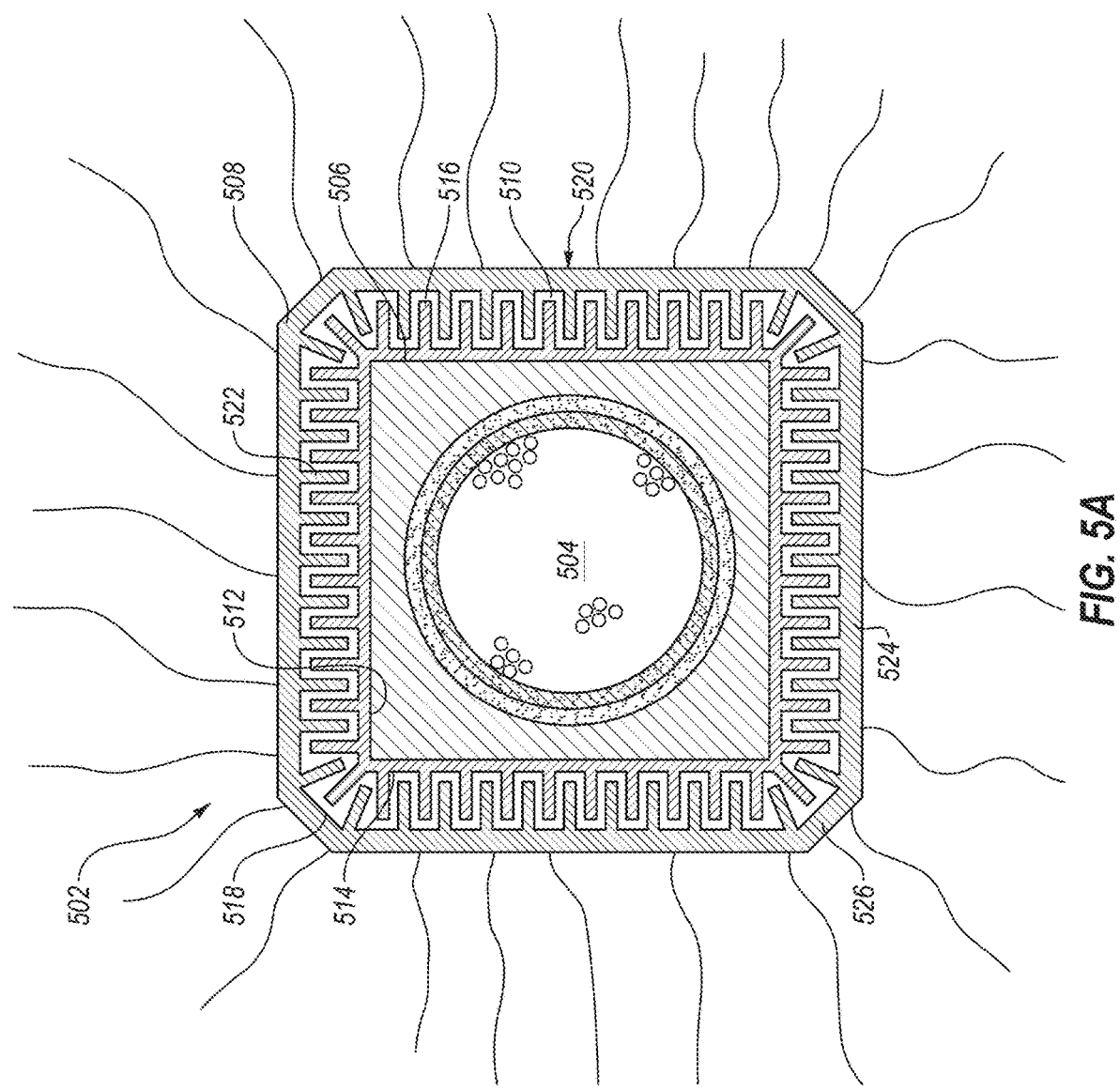
FIG. 5A illustrates a cross-sectional view of a nuclear reactor in accordance with embodiments of the disclosure.
Figure 5B:
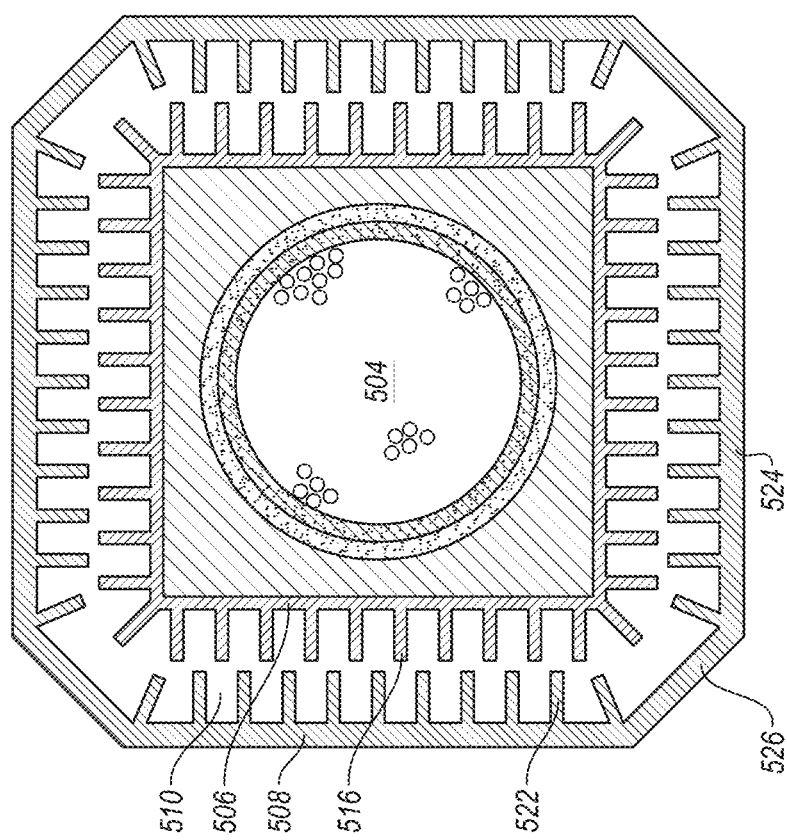
FIG. 5B illustrates a cross-sectional view of the nuclear reactor of FIG. 5A with the heat transfer system in an expanded configuration.

FIGS. 5A and 5B illustrate another embodiment of a heat transfer system 502 surrounding a reactor core 504. In some embodiments, the heat transfer system 502 exhibits a square or rectangular cross-sectional shape. Similar to the embodiments described above, the heat transfer system 502 includes an inner wall 506 and an outer wall 508 separated by a volume 510. The inner wall 506 includes an inner surface 512 in direct contact with an outer portion of the reactor, such as shielding or a reflector surrounding the core 504. The inner wall 506 also includes fins 516 extending into the volume 510 from an outer surface 514 of the inner wall 506. The fins 516 and the outer surface 514 of the inner wall 506 are configured to radiate heat through the volume 510 to an inner surface 518 of the outer wall 508 and/or fins 522 extending from the inner surface 518 into the volume 510. The outer wall 508 is then configured to transfer the heat to a surrounding environment through direct contact between an outer surface 520 of the outer wall 508 and the surrounding environment.

The outer wall 508 may be arranged with substantially straight side walls 524 joined by short corner walls 526 extending between the substantially straight side walls 524. In some embodiments, the outer wall 508 is configured to expand (e.g., extend radially away from the core 504) or contract (e.g., retract radially toward the core 504) to change a size of the volume 510 and/or to change a space between the inner wall 506 and the outer wall 508 and/or to change the view factor between the inner wall and its fins and the outer wall and its fins. For example, in the embodiment illustrated in FIG. 5B, the straight side walls 524 extend radially away from the inner walls 506. The corner walls 526 may be configured to stretch, such as through telescoping arrangements, accordion arrangements, etc., to accommodate the radial extension of the side walls 524. As discussed above, extending the outer wall 508 radially away from the inner wall 506 may decrease the view factor between inner and outer walls and increase a thermal resistance of the volume 510 such that the heat transfer system 502 may restrict heat transfer across the heat transfer system 502 to a higher temperature. Thus, the heat transfer system 502 including the ability to change a radial position of the outer wall 508 may facilitate adjusting the operating temperature of the reactor heat transfer system 502 where the heat transfer system 502 begins to supplement heat removal.

Figure 6A:
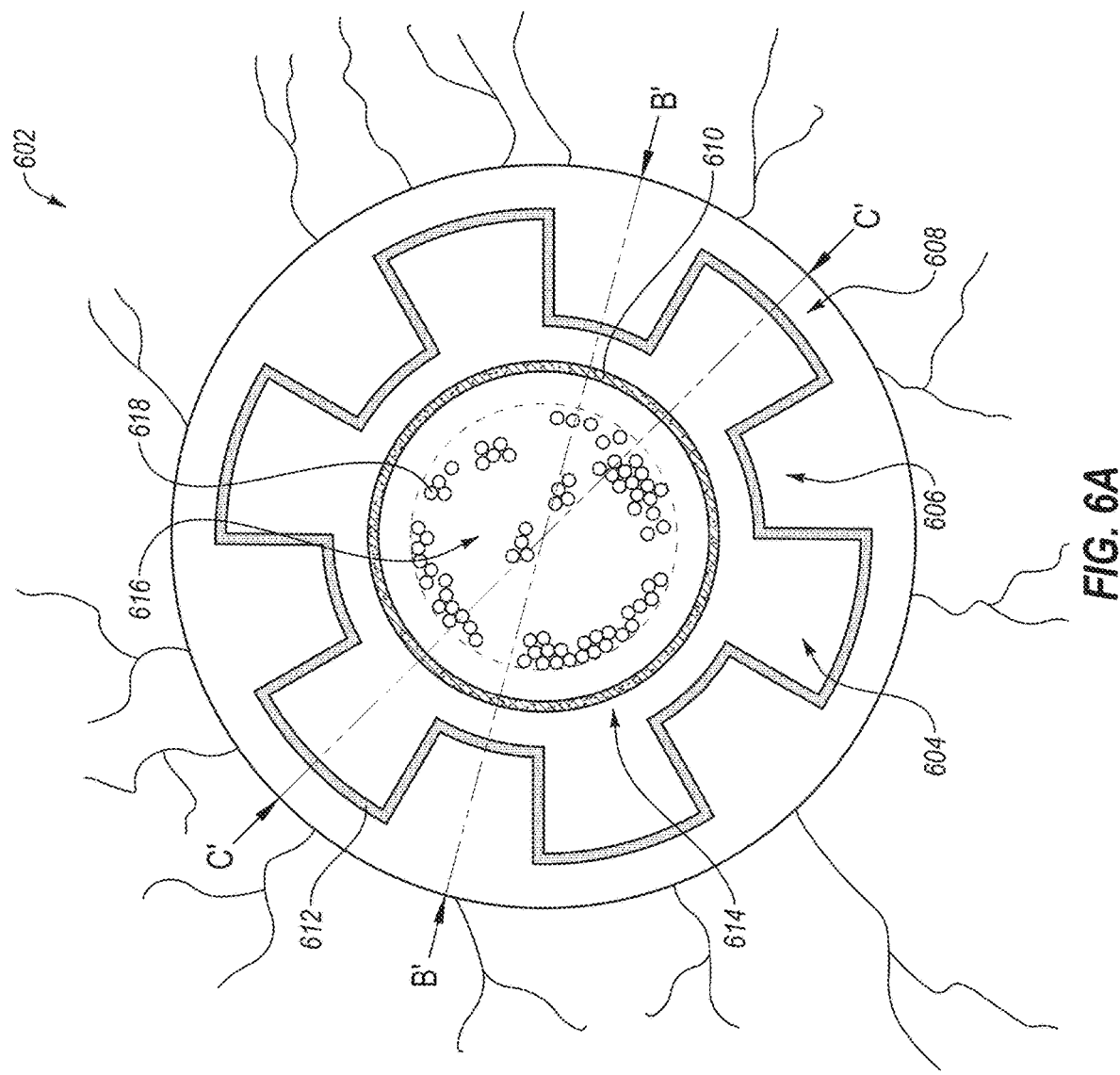
FIG. 6A illustrates a cross-sectional view of a nuclear reactor in accordance with embodiments of the disclosure.
Figure 6B:
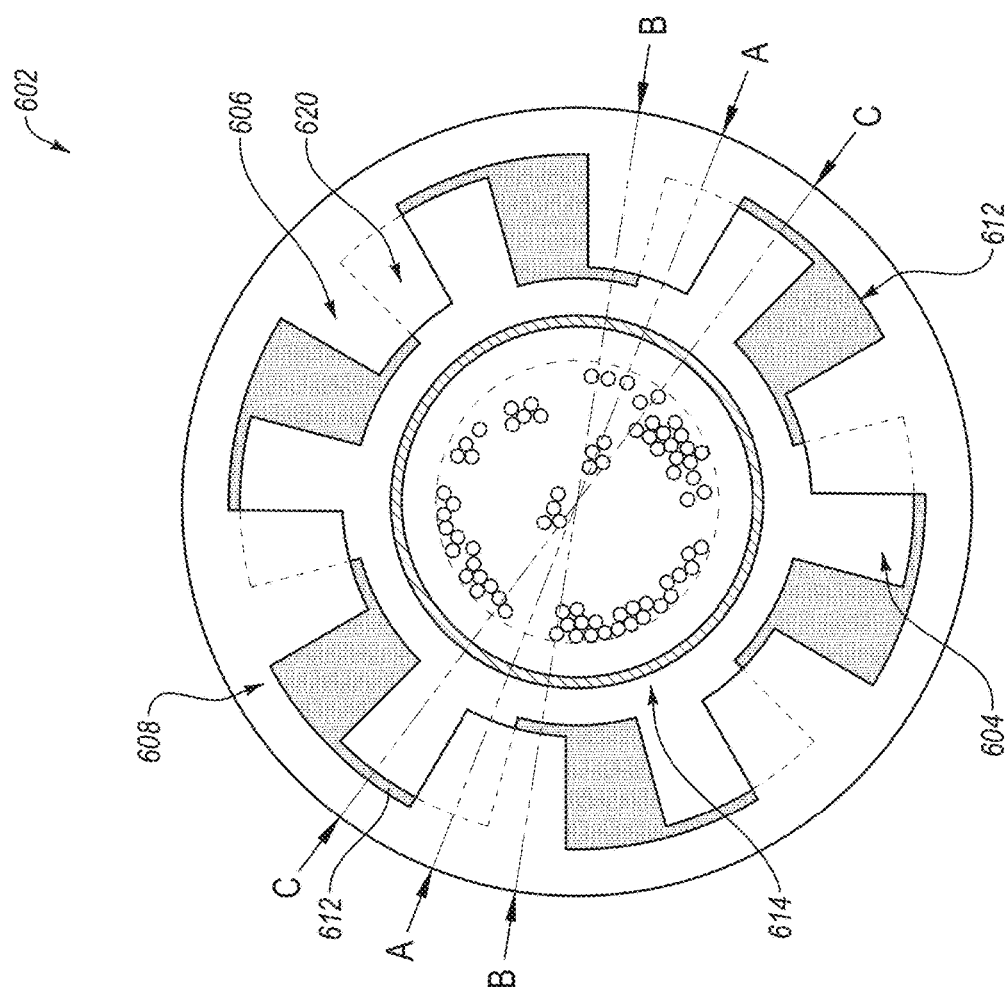
FIG. 6B illustrates a cross-sectional view of the nuclear reactor of FIG. 6A with the heat transfer system in a second configuration.

In some embodiments, the fins may be arranged perpendicular to the axis of the reactor core, such as depicted in figures FIG. 6A to FIG. 6E. In this case, the fins are horizontal if the axis of the reactor core 616 is vertical and vice versa. In the non-limiting example of FIG. 6A, the top view of the reactor 602 displays six partial fins 604 attached to the inner wall 614 of the heat transfer system and six partial fins 606 attached to the outer wall 608. The fins 604 attached to the inner wall 614 and the fins 606 attached to the outer wall 608 are offset in the vertical direction, and this pair pattern is repeated along the full length of the reactor 602 axial extent. The fins 604, 606 along the vertical direction are displayed in FIG. 6D and FIG. 6E, which show the vertical cuts B'-B and C'-C of FIG. 6A. Although FIG. 6A and FIG. 6B show six fins 604, 606 attached to each of the inner wall 614 and outer wall 608, in other embodiments, any number of partial fins 604, 606 (in a given plane) may be attached to each of the inner wall 614 and outer wall 608, provided the fins 604 on the inner wall 614 are matched with fins 606 on the outer wall 608.

Figure 6C:
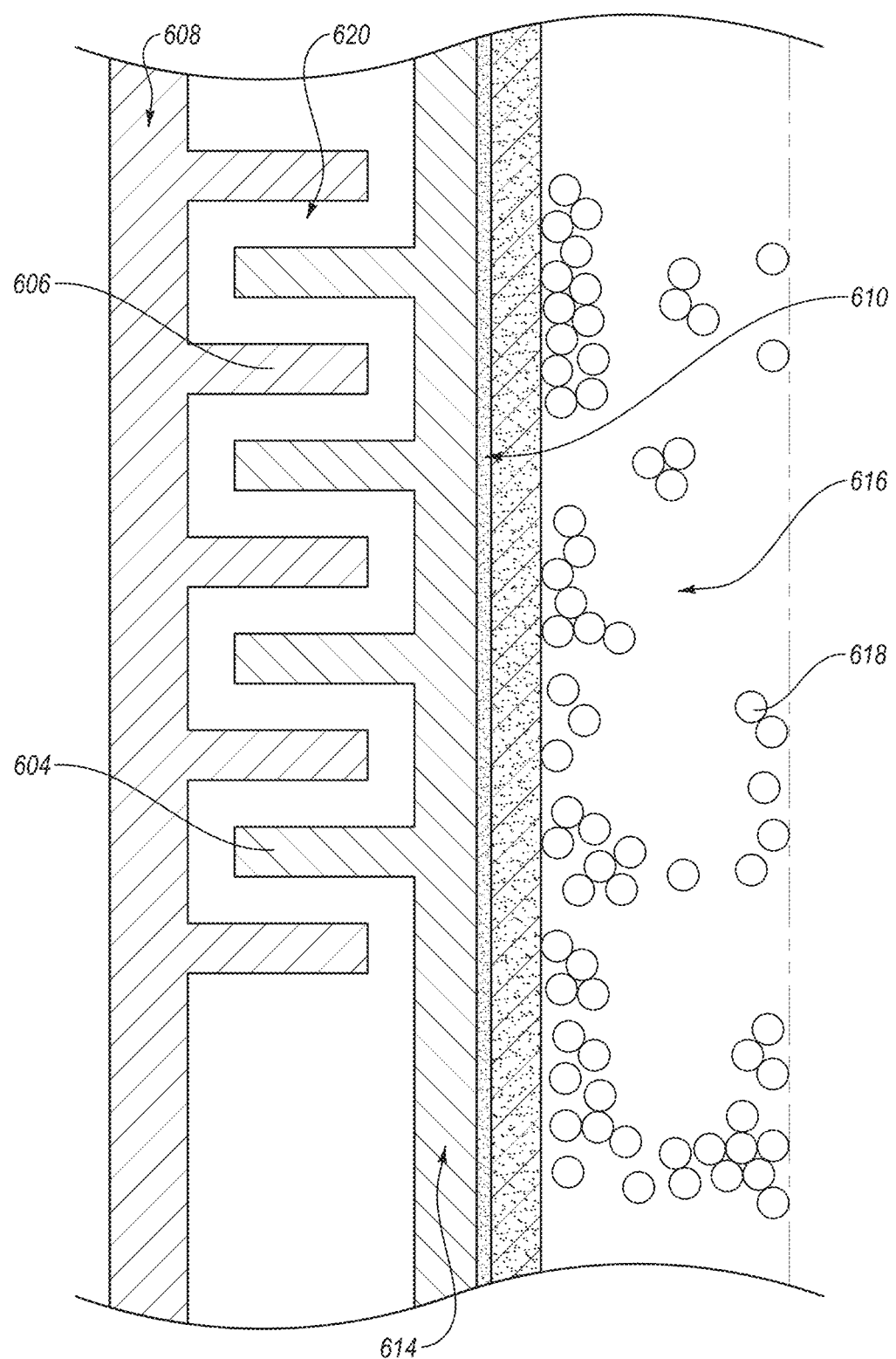
FIG. 6C illustrates a cross-sectional view of the nuclear reactor of FIG. 6B along line A'-A.
Figure 6D:
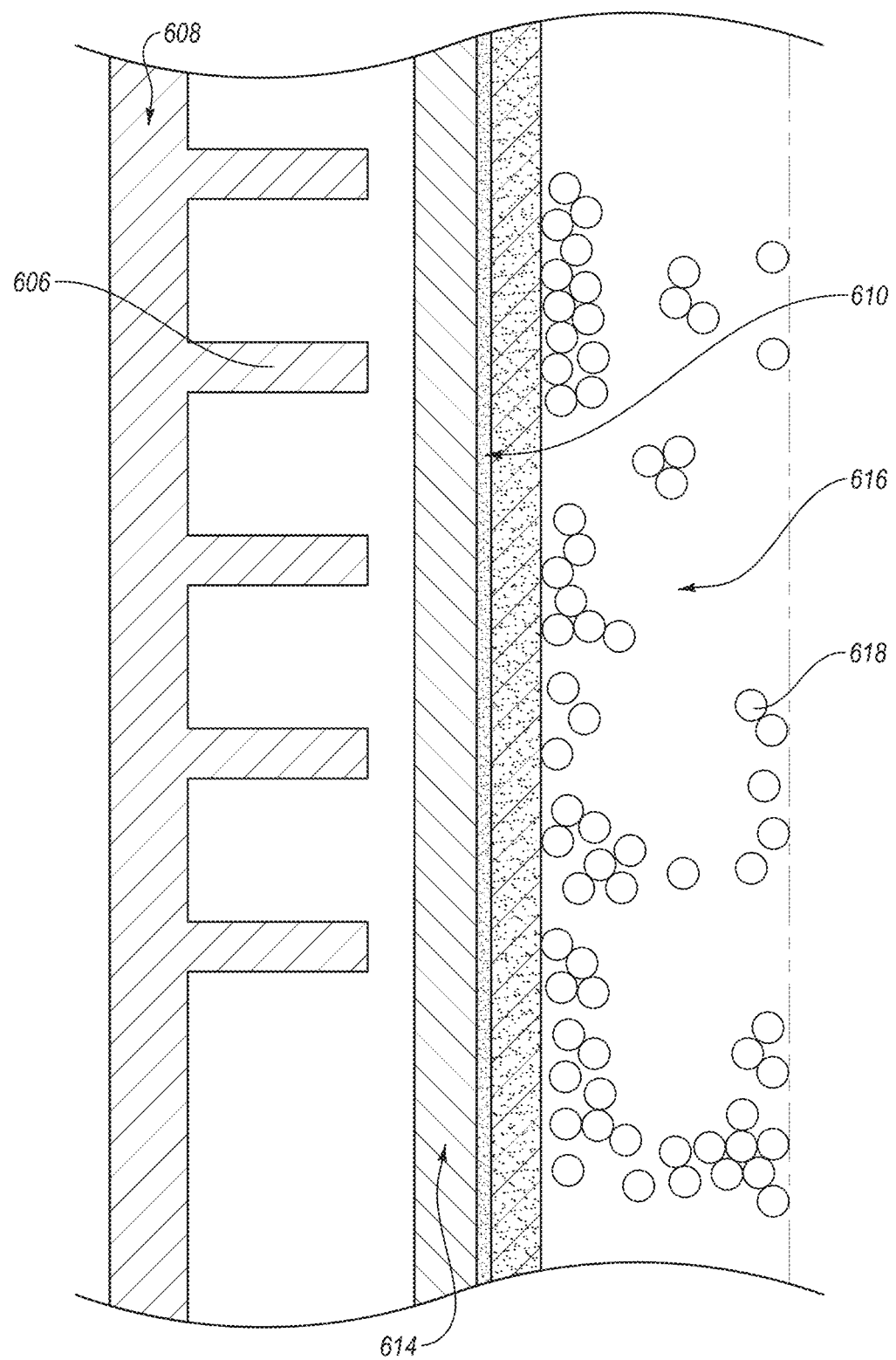
FIG. 6D illustrates a cross-sectional view of the nuclear reactor of FIG. 6B and/or FIG. 6A along line B'-B.
Figure 6E:
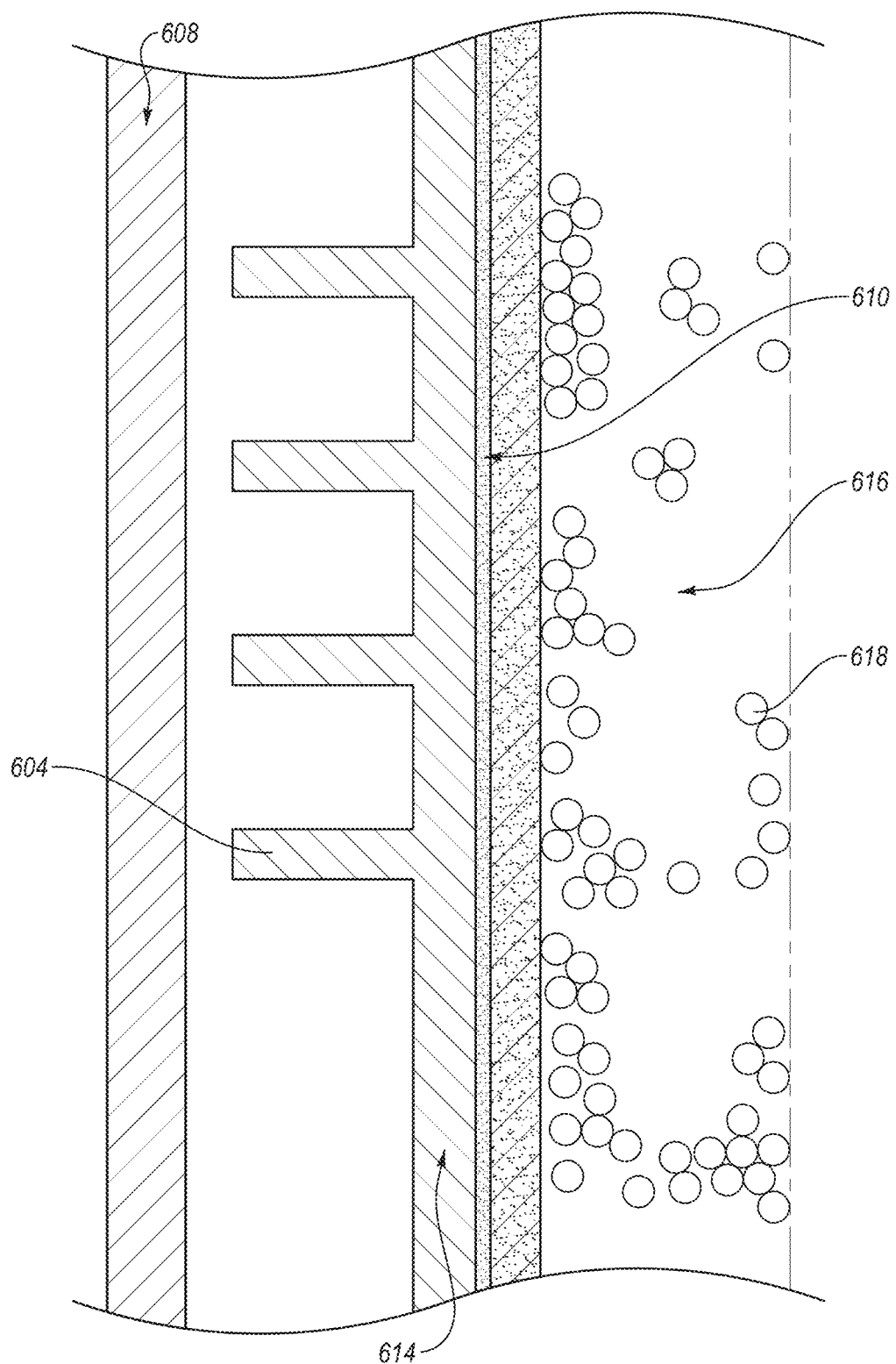
FIG. 6E illustrates a cross-sectional view of the nuclear reactor of FIG. 6B and/or FIG. 6A along line C'-C.

In embodiments with partial fins 604, 606, the outer wall 608 may be configured to rotate relative to the inner wall 614. For example, the outer wall 608 may be mounted on ball bearings and rails and may be fitted with a motor configured to selectively rotate the outer wall 608 relative to the inner wall 614. The outer wall 608 and its attached fins 606 may be rotated to present partial overlap 620 with the static fins 604 on the inner wall 614, as shown in FIG. 6B. The different overlap conditions are illustrated in the cross-sectional views of FIGS. 6C-6E. For example, cut A'-A, of FIG. 6B is shown in FIG. 6C, the cut B'-B of FIG. 6B is shown in FIG. 6D, and the cut C'-C is shown in FIG. 6E. As illustrated in FIGS. 6B and 6C, there is overlap 620 of fins in the region along cross-section A'-A. FIG. 6C illustrates the alternating inner wall fins 604 and outer wall fins 606. As illustrated in FIGS. 6B and 6D, the fins 604, 606 do not overlap in the region along cross-section B'-B, such that the outer wall fins 606 are visible in FIG. 6D, while the inner wall fins 604 are not visible. As illustrated in FIGS. 6B and 6E, there also is no overlap in the region along cross-section C'-C, such that the inner wall fins 604 are visible in FIG. 6E, while the outer wall fins 606 are not visible.

The variable overlap may facilitate adjustment of the view factor between the inner wall 614 and the associated fins 604 on one side and outer wall 608 and associated fins 606 on the other. The adjustment of the view factor may facilitate adjusting the threshold temperature for enhanced cooling. It may also facilitate convective natural circulation cooling for a given configuration. In some embodiments, pairs of fin sets on the inner and outer wall are offset by a design angle rotation around the axis of the reactor. In such an embodiment, even when the outer wall is rotated to maximize the view factor between inner and outer sides of the heat transfer system, no continuous path along the axial (vertical) direction is formed and convection continues to be impeded. In FIG. 6A, the fins are shown in a non-overlapping configuration. In this configuration, a majority of the open space 612 around the reactor vessel 610 (i.e., the space between the inner wall 614 and the outer wall 608) is blocked in the vertical direction. In this configuration, vertical flow of air or another gas that is selected to be between the inner wall 614 and the outer wall 608 is impeded, which, in turn, inhibits the natural convection and decreases any cooling of the inner wall 614.

In another embodiment of the horizontal fin configuration (i.e., fins arranged perpendicular to reactor axial dimension), the fins 604, 606 may be configured as full annular rings covering 360 degrees rather than the partial fins discussed above. In this case, any cut on a figure similar to FIG. 6A or FIG. 6B would look like FIG. 6C, with alternating inner wall fins 604 and outer wall fins 606.

Materials selection and surface treatments for horizontal fins and their associated walls would be the same as discussed earlier for the vertical (or parallel to the reactor axis) fins.

In some embodiments, the heat transfer system comprising an inner wall, an outer wall, and fins attached to the walls, may be made in part or in whole of a material with high thermal conductivity and high thermal capacity, such as, by non-limiting example, silicon carbide. This allows the heat transfer system to function as a thermal inertia buffer that protects the reactor from increases in temperature that could threaten the integrity of the fuel 618 or the reactor vessel 610. When the normal cooling process that transfers heat to the cooling fluid and hence into the heat engine stops functioning or fails, heat is transferred radially into the heat transfer system and thence into the surrounding environment. In this last process, the outermost radial surface and the balance provides a larger surface area than the reactor vessel and thus it would allow more heat to escape to the surrounding environment all other factors and conditions being equal. Also, the necessity of release of heat to the surrounding environment is delayed by the thermal inertia effect of the mass of the heat transfer system and its heat capacity. The total heat storage capacity may be made to match the decay heat generated until the decay heat generation rate decreases enough to be matched by heat release capacity of the outermost surface. This can be effected simply by adjusting the thickness and hence the mass of the inner wall of the heat transfer system.

Figure 7:
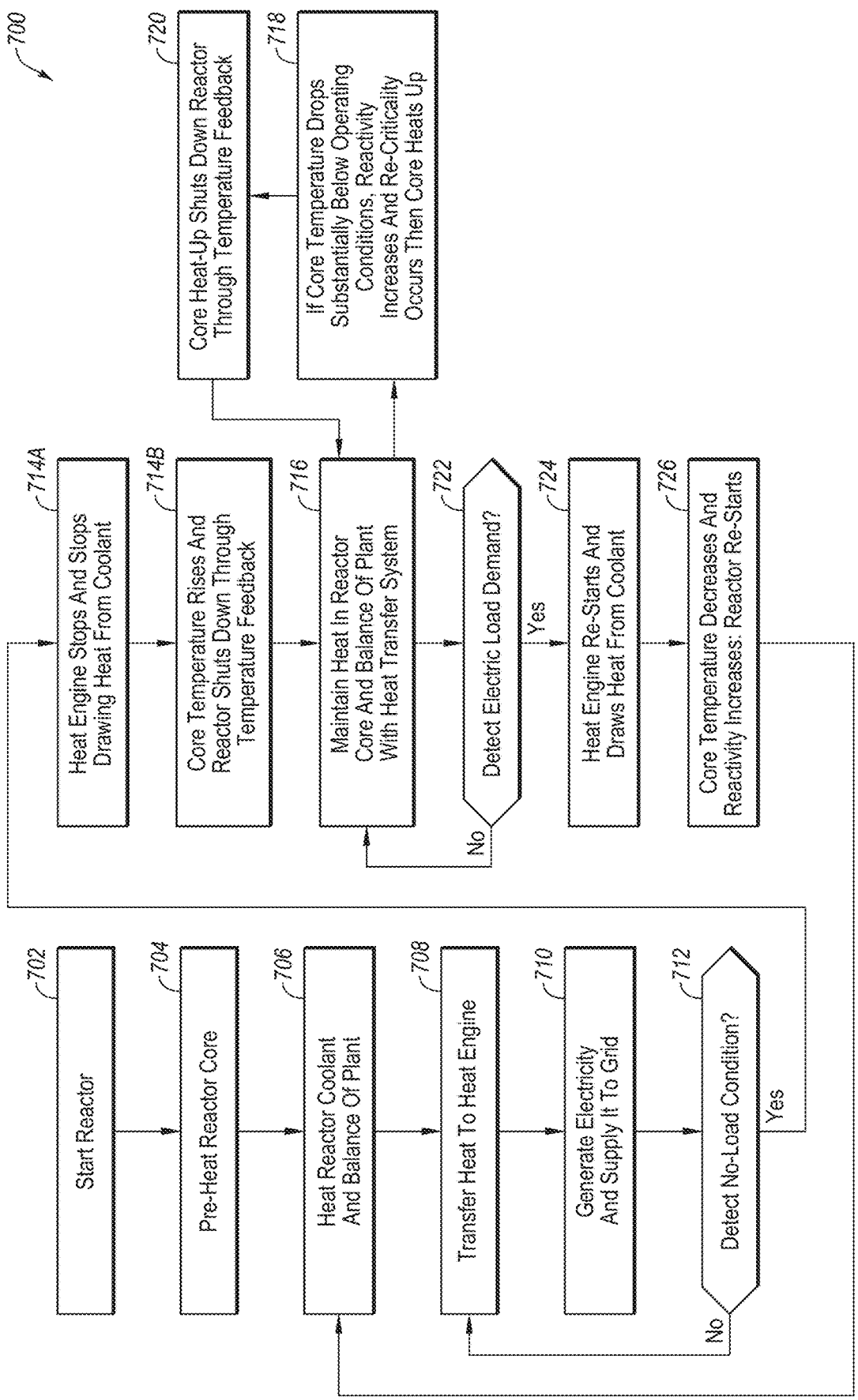
FIG. 7 illustrates a flow chart representative of a method of operating a nuclear power system in accordance with embodiments of the disclosure.

FIG. 7 illustrates a flow chart representative of a method of operating nuclear power system 700. When a nuclear power system is started in act 702, the reactor core will generate heat and may be gradually pre-heated in act 704. The generated heat may also pre-heat the cooling fluid and the rest (or balance) of the reactor plant. Pre-heating the reactor core may change a phase of a cooling material in the reactor core. For example, the cooling material may be a solid at room temperature (e.g., about 70° F., 21° C.). In other embodiments, pre-heating the reactor core may reduce a viscosity of the initially liquid or gaseous cooling fluid to facilitate improved flow properties. Pre-heating is completed when all components reach their respective operating temperatures.

After pre-heating the reactor core and the cooling fluid, the reactor may begin to operate in its normal operating mode. The heat generated by the reactions may be used to further heat the cooling fluid in the reactor core in act 706. In some reactor configurations, the heat transferred to the cooling fluid may induce fluid flow through natural convection causing the heated cooling fluid to rise in the reactor core and be replaced with cooler cooling fluid. In other embodiments, a pump induces flow of the cooling fluid through the reactor core.

The heated cooling fluid may then transfer heat to a heat engine in act 708. For example, the heated cooling fluid may transfer heat to a working fluid through a heat exchanger, as discussed above, with respect to FIG. 1A. The working fluid may then transfer heat to the heat engine. The heat engine may include a turbine, a Sterling engine, a reciprocal cylinder, etc. The working fluid may cause the heat engine to rotate. For example, heating the working fluid may cause the working fluid to change phases, such as from a liquid to a vapor. The expansion caused by the phase change may be captured by the heat engine and converted to rotation. In other embodiments, the heat engine may be configured to generate movement based on a temperature differential across the heat engine, such as a Sterling engine.

The rotation or movement of the heat engine may be transferred to a generator to generate electricity in act 710. For example, the generator may include windings (e.g., coils, armature) and magnets. At least one of the magnets and the windings are configured to rotate relative to the other of the magnets and the windings to induce a current in the windings and generate electricity. The rotation of at least one of the magnets or the windings is driven by the heat engine.

The nuclear power system may be configured to match a heat output to the electrical load on the generator. For example, an increased electrical load may result in a greater amount of heat being transferred from the cooling fluid to the heat engine to generate a greater amount of electricity to satisfy the increased electrical load. Similarly, a reduced electrical load may result in less heat being transferred from the cooling fluid to the heat engine to generate less electricity. As discussed above, the nuclear reactor may be configured to self-regulate, such that if the cooling fluid enters the reactor at a higher temperature less heat is transferred to the cooling fluid. In some embodiments, the self-regulation may be performed by reaction control devices, such as control rods or control drums. In other embodiments, such as reactors where the cooling fluid flows through the reactor through natural convection, the transmission of heat may be controlled by the temperature differential across the reactor. In other embodiments, self-regulating would result from the coolant carrying less heat away from the fuel, thus resulting in an increase of the fuel temperature and inducing the negative reactivity reactions in the fuel, which would lower the rate of fission reactions and decrease reactor power output. A sufficient increase in fuel temperature may shut down the reactor entirely. The nuclear power system may also be configured to determine if there is no electric load on the generator in act 712.

The nuclear power system may be configured to stop rotation of the heat engine and generator in act 714A when a no-load condition is detected in act 712. For example, the nuclear power system may include a brake (e.g., brake 146 (FIG. 1A)) configured to slow and/or stop the heat engine. In another example, the heat engine may be stopped by an electromagnetic brake. When the heat engine is stopped the heat engine will stop removing heat from the working fluid or the cooling fluid. With no heat being removed from the cooling fluid, the reactor may substantially stop inputting heat into the cooling fluid. When less heat or no heat is transferred from the reactor core into the cooling fluid loop, the reactor core temperature may rise and induce negative reactivity. The reactor core may shut down such that the fission reactions in the reactor core may be minimized or stopped. In some embodiments, the reactor core will initially increase in temperature above a threshold temperature due to no heat being removed from the core into the cooling fluid and from the cooling fluid into the heat engine. In some cases, the overheating may trigger the reactor to shut down, such as by negative temperature feedback in act 714B. In other cases, the reactor may receive a signal to shut down when the heat engine is stopped.

A heat transfer system, such as heat transfer systems 125, 224, 308, 402, 502 (FIGS. 1B-5B) surrounding the reactor, may maintain the reactor core at a temperature between two thresholds, an upper threshold and a lower threshold as shown in acts 716, 718 and 720. The lower threshold is sufficiently high to ensure the reactor remains in its shutdown state by retaining heat within the core, while the upper threshold is sufficiently low to prevent the core from reaching temperatures detrimental to the integrity of the fuel and the vessel. If the temperature climbs above a specified upper threshold (e.g., via heating caused by decay heat) the heat transfer system facilitates transfer of heat away from the reactor. Cooling via the heat transfer system would continue until the reactor temperature falls below the upper threshold temperature. If the core temperature drops below the lower threshold (e.g., via thermal losses through walls and other reactor structural components), positive reactivity may result, and the core would experience re-criticality and hence energy release from fission events that results in an increase in temperature (act 718) up to a temperature high enough to cause negative reactivity to again shut down the reactor (act 720). Following the renewed shut down, decay heat may further increase the temperature of the core. The temperatures may vary between the upper threshold and the lower threshold while remaining within a range of operating temperatures for the reactor plant.

As discussed above, the cooling fluid may solidify at lower temperatures and would have to be pre-heated prior to operation. In some embodiments, the energy transfer and energy conversion for generating electricity and the actual energy conversion to electricity may not occur until the reactor, the coolant, and the entire coolant path from the reactor core to the heat engine are at operating temperature. Therefore, the heat transfer system may be configured to substantially prevent heat loss from the reactor through the heat transfer system when the temperatures within the reactor are below a threshold. If the core temperature decreases below an operating temperature threshold, the reactor may restart when the core or fuel temperature decrease is sufficient to inject enough positive reactivity to cause criticality and heat the core back up to operating temperatures in act 718. Thus, the heat transfer system may maintain the heated temperature of the reactor in act 716. Maintaining the heated temperature of the reactor may facilitate quickly restarting electricity generation without going through a pre-heating process when the heat engine and generator are restarted to satisfy an electric load. Restarting electricity generation and restarting the heat engine may result in extracting heat from the cooling fluid, which in turn will result in a temperature decrease in the core and hence in the fuel and a resultant positive reactivity insertion and a restart of the fission chain reaction process and a restart of the reactor.

When the reactor is shut down, and while it remains shutdown, xenon may build up in the core as the neutron flux drops to levels that are insufficient for the destruction of the xenon precursors. Xenon peaks at a level that is proportionate to the fission power density at which the reactor was operated prior to shut down: the lower the power density the lower the xenon peak level and conversely, the higher the power density, the higher the peak xenon density. Xenon acts as a neutron poison; meaning that it absorbs neutrons and deepens the state of shutdown. When the core temperature decreases, following a restart of the heat engine and extraction of heat from the coolant and thence from the reactor core, the reactor would restart provided the core or fuel temperature decrease is sufficient to inject enough positive reactivity to cause criticality. The amount of injected reactivity must also be sufficient to overcome any negative reactivity stemming from the presence of xenon. The temperature decrease expected from operating the heat engine is sufficient to overcome the xenon poison effect if the power density of the reactor is in the range of power densities of conventional pebble bed reactor configurations, such as from about 1 MWth/m$^3$ to about 6 MWth/m$^3$. A power density of about 1 MWth/m$^3$ will facilitate the reactor restarting upon operating the heat engine for a relatively short period of time, such as in the range of about 1 minute to about tens of minutes, and even hours, depending on the fuel composition, its enrichment level and moderator to fuel ratio. These power density levels may be compatible with use in microreactors among other types of reactors or nuclear systems. The power density to be used may be determined by a person of ordinary skill in the art based on the type of fuel that is used and its precise composition. When the xenon negative reactivity cannot be overcome by a lowering of temperature of the fuel, such as when the fuel has been partly used, control elements (such as control rods or control drums) positions may be altered to compensate for the xenon negative reactivity and for fuel usage.

The nuclear power system may detect when an electric load returns in act 722. The nuclear power system may then re-start the heat engine in act 724. Re-starting the heat engine may include releasing a brake. Re-starting the heat engine may also entrain re-starting the reactor by positive reactivity insertion from core temperature drop in act 726 or adjusting the reactor control elements to increase reactions within the reactor in act 726. Once the reactor is restarted, the reactor may begin transferring heat to the heat engine through the cooling fluid in act 708. The heat transfer system in its insulating mode, i.e., below an upper threshold temperature, maintains the reactor and cooling fluid at or above operating temperatures, which ensures the hot side of the heat engine is at a temperature sufficiently high to provide a temperature differential. Also, a heat engine may restart when there is a temperature differential across the heat engine, thus by transferring heat to the heat engine the reactor may cause the heat engine to restart and begin transmitting rotation to the generator to satisfy the electric load.

Embodiments of the disclosure may facilitate a nuclear power system capable of modulating power production based on demand and include the ability to turn the power production on and off instantly or near instantly similar to a battery, such that power from fission reactions is only generated when needed. This may facilitate the use of nuclear power systems for smaller installations that may experience high demand fluctuations.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A nuclear power system comprising:
    a nuclear reactor configured to generate heat;
    a heat engine operatively coupled to the nuclear reactor, the heat engine configured to convert the heat from the nuclear reactor to mechanical energy;
    a generator operatively coupled to the heat engine, the generator configured to generate electricity from the mechanical energy of the heat engine;
    a brake coupled to at least one of the heat engine and the generator, the brake configured to restrict movement of the at least one of the heat engine and the generator when there is no electrical load on the generator; and
    a heat transfer system surrounding a reactor core of the nuclear reactor, the heat transfer system including:
        a volume defined between an inner wall and an outer wall;
        a first plurality of fins extending from the inner wall into the volume; and
        a second plurality of fins extending from the outer wall into the volume,
        wherein the outer wall is configured to move relative to the inner wall and change a distance between the first plurality of fins and the second plurality of fins.

2. The nuclear power system of claim 1, wherein the heat transfer system is configured to:
    substantially prevent a transfer of heat from the nuclear reactor to a surrounding environment when the reactor core is below a threshold temperature; and
    transfer heat to the surrounding environment when the reactor core is above the threshold temperature.

3. The nuclear power system of claim 1, wherein the outer wall is configured to move relative to the inner wall and change a size of the volume defined between the inner wall and the outer wall.

4. The nuclear power system of claim 1, wherein at least one of the inner wall and the outer wall include protrusions extending into the volume.

5. The nuclear power system of claim 1, wherein the inner wall includes inner protrusions extending into the volume and the outer wall includes outer protrusions extending into the volume.

6. The nuclear power system of claim 1, wherein at least one of the inner wall and the outer wall are configured to move relative to the other of the inner wall and the outer wall to change a view factor between the first plurality of fins and the second plurality of fins.

7. A method of operating a nuclear power system comprising:
    generating heat in a nuclear reactor core;
    transmitting the heat to a heat engine;
    generating electricity with a generator operatively coupled to the heat engine;
    detecting a no-load condition;
    stopping the heat engine;
    transferring heat from an outer surface of the nuclear reactor core to an environment surrounding the nuclear reactor core through a heat transfer system comprising an inner wall, an outer wall, a volume defined between the inner wall and the outer wall, a first plurality of fins extending from the inner wall into the volume, and a second plurality of fins extending from the outer wall into the volume if a temperature of the nuclear reactor core rises above a threshold temperature; and
    preventing heat from substantially transferring from the outer surface of the nuclear reactor core to the environment through the heat transfer system if the temperature of the nuclear reactor core is below the threshold temperature, by moving the outer wall relative to the inner wall to change a distance between the first plurality of fins and the second plurality of fins.

8. The method of claim 7, further comprising changing the threshold temperature by moving the outer wall of the heat transfer system radially away from the inner wall of the heat transfer system.

9. The method of claim 7, further comprising changing the threshold temperature by changing a view factor between the first plurality of fins extending from the inner wall of the heat transfer system and the second plurality of fins extending from the outer wall of the heat transfer system.

10. The method of claim 9, wherein changing the view factor between the first plurality of fins and the second plurality of fins comprises rotating at least one of the inner wall and the outer wall relative to the other of the inner wall and the outer wall.

11. The method of claim 7, wherein
    transferring heat from the outer surface of the nuclear reactor core to the environment through the heat transfer system includes:
    transferring heat from the outer surface of the nuclear reactor core to the inner wall of the heat transfer system through conduction;
    transferring heat from the inner wall of the heat transfer system to the outer wall of the heat transfer system through radiation through the volume defined between the inner wall and the outer wall; and transferring heat from the outer wall of the heat transfer system to the environment.

12. The method of claim 7, further comprising:
detecting a load condition;
restarting the heat engine;
transmitting the heat from the nuclear reactor core to the heat engine and restarting the nuclear reactor core through temperature feedback; and
resuming generating heat in the nuclear reactor core as the nuclear reactor core restarts.

13. A nuclear reactor comprising:
a reactor core; and
a heat transfer system surrounding the reactor core, the heat transfer system including:
an inner wall;
an outer wall;
a volume defined between the inner wall and the outer wall;
a first plurality of fins extending from the inner wall into the volume; and
a second plurality of fins extending from the outer wall into the volume,
wherein the outer wall is configured to move relative to the inner wall and change a distance between the first plurality of fins and the second plurality of fins.

14. The nuclear reactor of claim 13, wherein the first plurality of fins and the second plurality of fins are oriented perpendicular to an axis of the nuclear reactor and one or more of the second plurality of fins are offset in the rotational direction with respect to others of the second plurality of fins preventing a straight convective path in the volume between the inner wall and the outer wall.

15. The nuclear reactor of claim 13, wherein the outer wall is configured to move radially relative to the inner wall.

16. The nuclear reactor of claim 15, wherein one or more of the second plurality of fins include at least two panels joined at a vertex, such that an angle between the at least two panels is configured to increase as the outer wall extends radially away from the inner wall.

17. The nuclear reactor of claim 13, wherein the outer wall is configured to rotate relative to the inner wall and change a view factor between the first plurality of fins and the second plurality of fins.

* * * * *